United States Patent
Baek

(10) Patent No.: US 12,408,086 B2
(45) Date of Patent: Sep. 2, 2025

(54) APPARATUS AND METHOD FOR PROVIDING MBS DATA TO USER EQUIPMENT IN CELLULAR COMMUNICATION SYSTEM

(71) Applicant: Samsung Electronics Co., Ltd., Suwon-si (KR)

(72) Inventor: Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 17/710,014

(22) Filed: Mar. 31, 2022

(65) Prior Publication Data

US 2022/0322160 A1 Oct. 6, 2022

(30) Foreign Application Priority Data

Mar. 31, 2021 (KR) ........................ 10-2021-0042380

(51) Int. Cl.
*H04W 36/00* (2009.01)
*H04W 36/08* (2009.01)

(52) U.S. Cl.
CPC ........ *H04W 36/0007* (2018.08); *H04W 36/08* (2013.01)

(58) Field of Classification Search
CPC ... H04W 36/0007; H04W 36/08; H04W 4/06; H04W 36/0033; H04W 36/385
See application file for complete search history.

(56) References Cited

U.S. PATENT DOCUMENTS

| | | | | |
|---|---|---|---|---|
| 2019/0158985 | A1* | 5/2019 | Dao | H04W 28/04 |
| 2021/0168568 | A1* | 6/2021 | Dao | H04L 12/185 |
| 2021/0352444 | A1* | 11/2021 | Griot | H04W 8/02 |
| 2022/0338069 | A1* | 10/2022 | Wang | H04W 76/27 |
| 2023/0065481 | A1* | 3/2023 | Xiong | H04W 36/0011 |
| 2023/0188949 | A1* | 6/2023 | Jia | H04L 12/1881 455/458 |
| 2023/0292227 | A1* | 9/2023 | Wang | H04W 36/0007 |
| 2023/0309189 | A1* | 9/2023 | R?nneke | H04W 4/06 |
| 2023/0345310 | A1* | 10/2023 | Li | H04W 76/40 |

OTHER PUBLICATIONS

International Search Report dated Jun. 23, 2022, issued an International Application No. PCT/KR2022/004611.
Nokia et al., 'Mobility from MBS Supporting to Non-Supporting MBS nodes', R3-210173, 3GPP TSG RAN WG3 #111-e; Jan. 14, 2021.

(Continued)

*Primary Examiner* — Abdullahi Ahmed
(74) *Attorney, Agent, or Firm* — Jefferson IP Law, LLP

(57) ABSTRACT

A method for Xn handover of a multicast/broadcast service (MBS) by a session management function (SMF) device in a mobile communication system is provided. The method includes receiving, from a target next generation radio access network (NG-RAN) node through an access and mobility management function (AMF), a first message including information on whether the target NG-RAN node supports the MBS, determining an individual delivery method for MBS data, in case that the target NG-RAN node does not support the MBS based on the first message, and setting up the MBS data to be individually delivered to a user equipment (UE) through the target NG-RAN node.

12 Claims, 11 Drawing Sheets

(56) References Cited

OTHER PUBLICATIONS

CMCC, 'MBS Session management over NG', R3-210920, 3GPP TSG RAN WG3 #111-e; Jan. 15, 2021.
Huawei et al., 'Mobility Procedures for 5MBS', S2-2100718, 3GPP TSG SA2 Meeting #143-e; Feb. 18, 2021.
Ericsson, 'On Support of mobility between gNBs supporting MBS', R3-210643, 3GPP TSG RAN WG3 #111-e; Jan. 15, 2021.
CATT: "Mobility support of MBS service", 3GPP Draft; S2-2100590, 3rd Generation Partnership Project (3GPP), Mobile Competence Centre; 650, Route Des Lucioles; F-06921 Sophia-Antipolis Cedex; France, vol. SA WG2, No. E (e-meeting); Feb. 24, 2020-Mar. 9, 2020, XP052172921, Feb. 18, 2021.
ZTE: "KI#7, new solution multicast MBS session handover with Dummy QoS Flow", 3GPP Draft; S2-2004509, 3rd Generation Partnership Project (3GPP), Mobile Competence Centre; 650, Route Des Lucioles; F-06921 Sophia-Antipolis Cedex; France, vol. SA WG2, No. Electronic, Elbonia; Jun. 1, 2020-Jun. 12, 2020, XP052461217, Jun. 12, 2020.
Shanghai Jiao Tong University: "Reliable delivery mode switching within single RAN/dual RANs", 3GPP Draft; S2-2006325, 3rd Generation Partnership Project (3GPP), Mobile Competence Centre; 650, Route Des Lucioles; F-06921 Sophia-Antipolis Cedex; France, vol. SA WG2, No. Online; Aug. 19, 2020-Sep. 2, 2020, XP052463738, Sep. 2, 2020.
Extended European Search Report dated Jun. 24, 2024, issued in European Application No. 22781651.9.

\* cited by examiner

APPARATUS AND METHOD FOR PROVIDING MBS DATA TO USER EQUIPMENT IN CELLULAR COMMUNICATION SYSTEM

CROSS-REFERENCE TO RELATED APPLICATION(S)

This application is based on and claims priority under 35 U.S.C. § 119(a) of a Korean patent application number 10-2021-0042380, filed on Mar. 31, 2021, in the Korean Intellectual Property Office, the disclosure of which is incorporated by reference herein in its entirety.

BACKGROUND

1. Field

The disclosure relates to a method and apparatus for transmitting multicast and/or broadcast data to a terminal. More particularly, the disclosure relates to a method and apparatus for transmitting multicast and/or broadcast data from a 5th-generation (5G) network to a terminal.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In order to transmit the same data to a plurality of terminals positioned in a specific region in a mobile communication network, data may be transmitted to each terminal, for example, a user equipment by unicast. Further, in some cases, for resource efficiency, it is necessary to provide a data service to a plurality of terminals in a mobile communication network through multicast/broadcast.

In this case, there is a need for a method of supporting a smooth reception of a service even when a terminal receiving a multicast or broadcast service moves and a base station thus changes.

Such a multicast service has been provided since the early 2000s, and as cellular networks develop, it is necessary to provide a multicast service in a manner that meets the standard of each cellular network. However, a method for appropriately providing a multicast service has not yet been provided in the 5G network.

The above information is presented as background information only to assist with an understanding of the disclosure. No determination has been made, and no assertion is made, as to whether any of the above might be applicable as prior art with regard to the disclosure.

SUMMARY

In order to provide a multicast service, a 5th-Generation system (5GS) receives multicast service data from an application function (AF) or a content provider and delivers the multicast service data to a next generation radio access network (NG-RAN), which is a base station, thus, the 5GS may transmit multicast service data to terminals, for example, user equipments (UEs) subscribing to the multicast service. There are two methods for a 5G core network to deliver multicast data to the NG-RAN shared delivery and individual delivery. When the NG-RAN has a multicast/broadcast service (MBS) capability, multicast service data may be transmitted from a multicast/broadcast user plane function (MB-UPF) device to the NG-RAN through a tunnel for shared delivery. However, because shared delivery is impossible when the NG-RAN does not have an MBS capability, it is possible to transmit multicast service data such as MBS data received through an MB-UPF as individual delivery is transmitted to the terminal through an associated protocol data unit (PDU) session and through a tunnel from the UPF to the NG-RAN. Therefore, as the terminal moves, there is a need for a method of smoothly supporting a multicast service to the mobile terminal according to whether the target NG-RAN supports an MBS capability.

Aspects of the disclosure are to address at least the above-mentioned problems and/or disadvantages and to provide at least the advantages described below. Accordingly, an aspect of the disclosure is to provide a method and apparatus for transmitting multicast and/or broadcast data from a 5G network to a terminal.

Additional aspects will be set forth in part in the description which follows and, in part, will be apparent from the description, or may be learned by practice of the presented embodiments.

In accordance with an aspect of the disclosure, a method for Xn handover of a multicast/broadcast service (MBS) by a session management function (SMF) device in a mobile communication system is provided. The method includes receiving, from a target next generation radio access network (NG-RAN) node through an access and mobility management function (AMF), a first message including information on whether the target NG-RAN node supports the MBS, determining an individual delivery method for MBS data, in case that the target NG-RAN node does not support the MBS based on the first message, and setting up the MBS data to be individually delivered to a user equipment (UE) through the target NG-RAN node.

In accordance with another aspect of the disclosure, a session management function (SMF) for Xn handover of a multicast/broadcast service (MBS) in a mobile communication system is provided. The SMF includes a network interface configured to communicate with network functions (NFs) in the mobile communication system, a memory configured to store information, and at least one processor configured to control to receive, from a target next generation radio access network (NG-RAN) node through an access and mobility management function (AMF) using the network interface, a first message including information on whether the target NG-RAN node supports the MBS, determine an individual delivery method for MBS data, in case that the target NG-RAN node does not support the MBS based on the first message, and set up the MBS data to be individually delivered to a user equipment (UE) through the target NG-RAN node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a term identifying an access node used in the description, a term indicating network entities, a term indicating messages, a term indicating an interface between network objects, a term indicating various types of identification information and the like are exemplified for convenience of description. Accordingly, the disclosure is not limited to the terms described below, and other terms indicating objects having equivalent technical meanings may be used.

Hereinafter, for convenience of description, the disclosure uses terms and names defined in the standard for a 5G system. However, the disclosure is not limited by the above terms and names, and may be equally applied to systems conforming to other standards.

Figure 1:
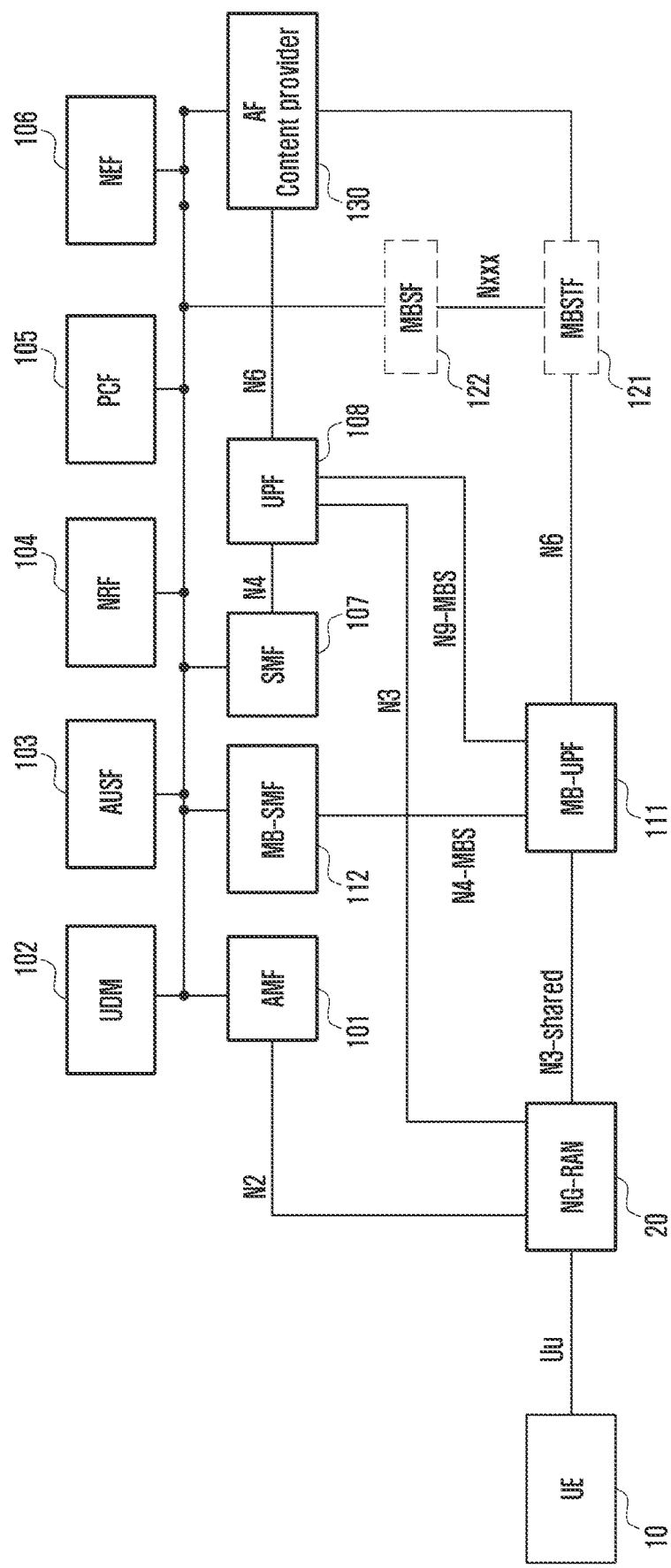
FIG. 1 illustrates a 5th-Generation System (5GS) structure for a multicast service according to an embodiment of the disclosure.

FIG. 1 illustrates a structure of a cellular system for an MBS service according to an embodiment of the disclosure.

Referring to FIG. 1, the cellular system may include a user equipment (UE) 10, an NG radio access network (NG-RAN) 20, which is a base station, an access and mobility management function (AMF) device 101, a multicast/broadcast user plane function (MB-UPF) device 111, a multicast/broadcast-session management function (MB-SMF) device 112, a policy control function (PCF) device 105, a session management function (SMF) device 107, a network exposure function (NEF) device 106, a multicast/broadcast service function (MBSF) device 122, a multicast/broadcast service transport function (MBSTF) device 121, an application function (AF) device 130, a unified data management (UDM) device 102, a user plane function (UPF) device 108, an authentication server function (AUSF) device 103, and an NF repository function (NRF) device 104.

In describing FIG. 1, each network function (NF) of the 5GS will be described as a "network function device" or a "network function" itself. However, those skilled in the art may know that the NF and/or the NF device may be implemented in one or more specific servers, and that two or more NFs performing the same operation may be implemented in one server.

One NF or two or more NFs may be implemented in the form of one network slice in some cases. Such a network slice may be generated based on a specific purpose. For example, the network slice may be configured for a subscriber group for providing the same type of service, e.g., a maximum data rate, a data usage rate, and a guaranteed minimum data rate to specific subscriber groups. Further, the network slice may be implemented for various purposes, and a further description will be omitted herein.

Further, each node interface is illustrated in FIG. 1. A Uu interface is used between the UE 10 and the NG-RAN 20, an N2 interface is used between the NG-RAN 20 and the AMF 101, and an N3-shared interface is used between the NG-RAN 20 and the MB-UPF 111. Further, an N4-MBS interface is used between the MB-UPF 111 and the MB-SMF 112, and an N9-MBS interface is used between the MB-UPF 111 and the UPF 108. An N4 interface is used between the SMF 107 and the UPF 108, an N6 interface is used between the UPF 108 and the AF 130, and an Nxxx interface is used between the MBSF 122 and the MBSTF 121. Because these interfaces are defined in the NR standard, a further description will be omitted here.

In general, in order to support the MBS service in the 5GS, a cellular system for the MBS may be configured with the following network function devices and services.

The AF 130 may be implemented into, for example, a V2X application server, a CIoT application server, an MCPTT application, a contents provider, a TV or audio service provider, and a streaming video service provider.

In order to provide an MBS service to a specific user or a specific user group, the AF 130 may request the provision of the MBS service to the MBSF 122, which is an NF that controls session management and traffic of the MBS service. For example, the MBSF 122 may be an NF that receives a request for an MBS service from the AF to manage a corresponding MBS service session, and to control the corresponding MBS service traffic. Further, the MBSTF 121 is an NF that receives media from AF/AS or a contents provider based on the control of the MBSF 122 to process media traffic and may operate as an MBS service anchor in the 5GS. In the disclosure, the AF 130 may be an application server (AS) for providing a specific multicast/broadcast application service. Therefore, hereinafter, it may be understood that the AS is the same as the AF 130 or that the AF 130 and the AS exist together. In order to provide the MBS service, when the AF 130 transmits a request for providing the MBS service to the UE 10 to the MBSF 122, the MBSF 122 may control the MBSTF 121, which is an MBS service media anchor in the 5GS that transmits MBS service traffic to the UE 10 so that the MBS service is provided to the UE 10. In this case, the MBS service is a service received from a specific contents provider, and may be one of various types of services exemplified above or other services.

According to an embodiment, the MBSF 122 and the MBSTF 121 may be configured to be integrated into one entity or one NF. As another example, the MBSF 122 may be configured to be integrated into the NEF 106 or another NF. As another example, in the 5GS, the AF 130 may directly request the MBS service to the MB-SMF 112 without the MBSF 122 and the MBSTF 121, and the MB-UPF 111 may receive media from a content provider, which is the AS or the AF 130 to forward traffic.

The MBS service session is managed and service traffic is generated through the MBSF 122 and the MBSTF 121, and when the service traffic is delivered to the UE 10 through multicast/broadcast, corresponding traffic may be managed by allocating an MBS PDU session. That is, the MBSF 122 may correspond to a control plane that manages the MBS session, and the MBSTF 121 may correspond to a user plane that handles traffic.

In the following description, a "multicast-broadcast service gateway-control plane (MBMS-GW-C) service" is referred to as a control function or service for generating an MBS context for the MBS PDU session, managing the MBS PDU session and delivering traffic of the MBS PDU session to the NG-RAN 20, which is a base station through IP multicast.

The MBMS-GW-C service may be integrated into an existing SMF that manages a unicast PDU session to be configured as an SMF with an MBS PDU session control function or may be configured as a separate NF. An NF supporting the MBMS-GW-C service and having a function of an existing SMF is referred to as an MB-SMF 112 in the disclosure.

Further, a service that delivers traffic received from the MB-UPF 111 according to an MBS context for the MBS PDU session through IP multicast to the NG-RAN 20 that performs multicast/broadcast according to the MBMS-GW-C service is referred to as a multimedia broadcast-multicast service gateway-user plane (MBMS-GW-U) service.

The MBMS-GW-U service may be configured with a UPF with a function of being integrated into the existing UPF that processes a unicast PDU session to deliver MBS traffic to an appropriate NG-RAN by IP multicast or may be configured with a separate NF, as illustrated in FIG. 1. Therefore, in the following description, an NF that supports the MBMS-GW-U service and that has together a function of the existing UPF will be referred to as the MB-UPF 111.

As described above, the MBMS-GW-C service uses an N4-MBS interface so as to control the MBMS-GW-U service.

In describing various embodiments of the disclosure, MBMS-GW-C and MBMS-GW-U are mainly described with the names SMF and UPF or the MB-SMF 112 and the MB-UPF 111, respectively, for convenience, but whether the use is unicast-only, multicast/broadcast-only, or both is described together to avoid confusion, as needed.

MBS traffic is delivered from the MBMS-GW-U (or UPF or MB-UPF) to the NG-RANs 20. For example, MBS traffic is delivered to the NG-RAN 20 using IP multicast. In this case, a tunnel between the MBMS-GW-U (or UPF or MB-UPF) and the NG-RAN is referred to as an M1 tunnel, a shared delivery tunnel, or a shared N3 tunnel.

In order to establish the M1 tunnel, the MBMS-GW-C (or SMF or MB-SMF) may transmit a control message to the NG-RAN 20 through the AMF.

Figure 2:
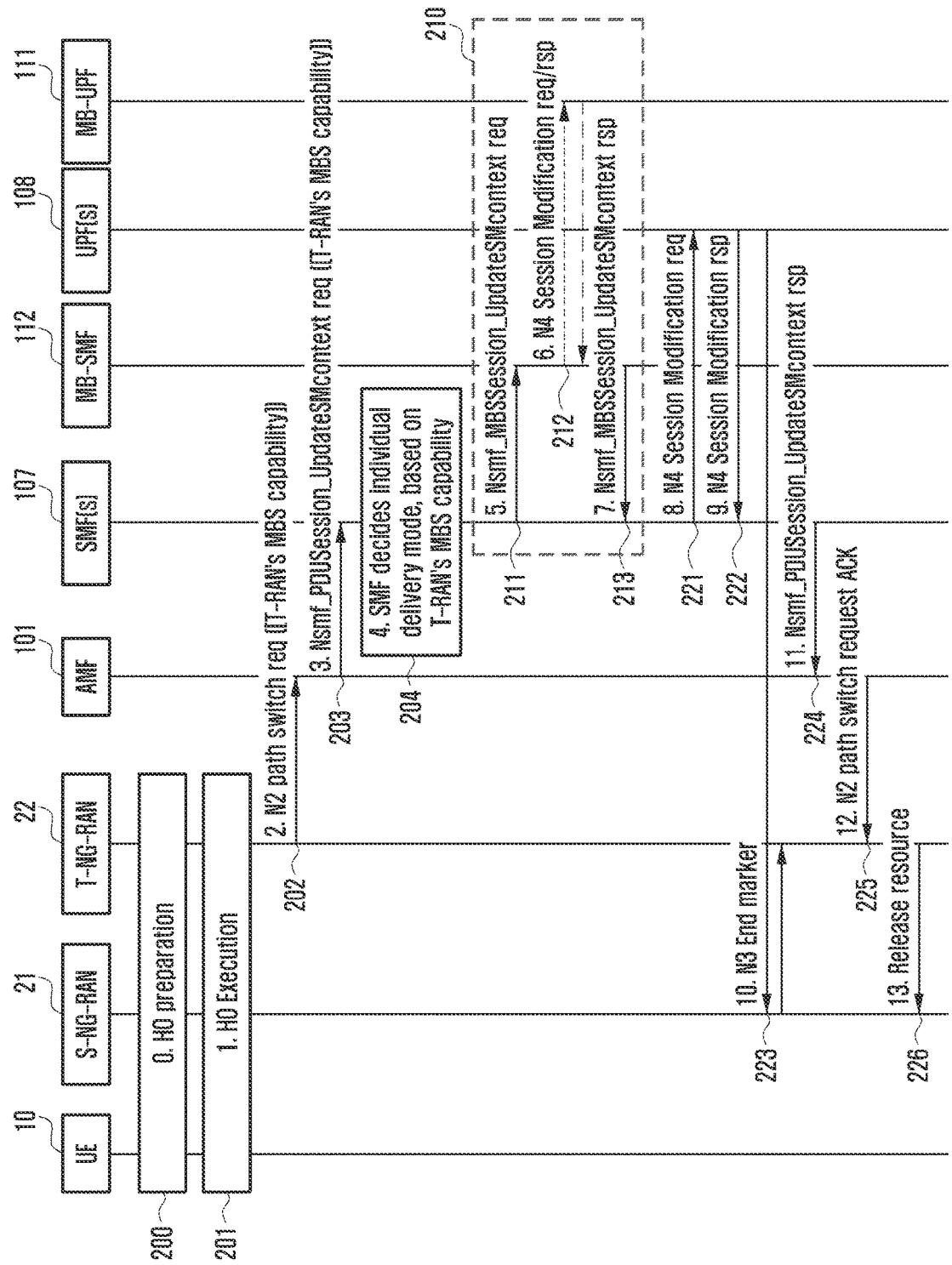
FIG. 2 illustrates a process of supporting Xn handover to a User Equipment (UE) in a multicast service according to an embodiment of the disclosure.

FIG. 2 illustrates a process of supporting Xn handover to a UE in a multicast service according to an embodiment of the disclosure.

In the following description, a serving NG-RAN, which is a serving base station, will be described with reference numeral 21, and a target NG-RAN, which is the target for handover, will be described with reference numeral 22. Further, in the disclosure, there may be a plurality of SMFs, and accordingly, they are indicated as SMF(s). However, it should be noted that reference numeral 107 illustrated in FIG. 1 is used for the SMF for convenience of description. Further, a plurality of UPFs may be used in the disclosure. It is noted that reference numeral 108 illustrated in FIG. 1 is used for the UPF for convenience of description.

Referring to FIG. 2, in operation 200, handover preparation (HO preparation) is performed between a serving NG-RAN 21 and a target NG-RAN 22, and in operation 201, Xn handover may be performed through HO execution. That is, the UE 10 may perform a handover procedure from the serving NG-RAN 21, which is a base station that was initially provided with a service to the target NG-RAN 22.

The target NG-RAN 22 may transmit an N2 path switch request message to the AMF 101 in operation 202 in order to move a data path flowing to the existing serving NG-RAN 21 to itself. In this case, the N2 path switch request message may be transmitted to the AMF 101 by including the N2 session management (SM) message sending to each SMF 107 or MB-SMF 112 for each session. In this case, the target NG-RAN 22 may include an MBS capability indicating whether it supports 5 MBS in the N2 path switch request.

The SM message may include tunnel endpoint information (address information of the target NG-RAN, tunnel ID, and the like) for the target NG-RAN 22 to receive data traffic for the corresponding session.

Upon receiving the N2 path switch request message in operation 202, the AMF 101 may transmit an Nsmf_PDUSession_UpdateSMcontext request message to the corresponding SMFs 107 in order to deliver the SM message sending to the SMF 107 in operation 203. The Nsmf_PDUSession_UpdateSMcontext request may include a 5 MBS capability of the target NG-RAN 22 from capability information of the NG-RAN already known by the AMF 101 through a configuration procedure, and the like separately from the N2 SM message.

In operation 204, the SMF 107 may determine to use an individual delivery method as a data traffic delivery method corresponding to the MBS session identifier (Session ID) according to the received 5 MBS capability of the target NG-RAN 22. The SMF 107 may know a 5 MBS capability through the capability transmitted by the target NG-RAN 22 with a method of identifying the 5 MBS capability of the target NG-RAN 22. The SMF 107 may know a 5 MBS capability by distinguishing whether an assigned tunnel ID in tunnel endpoint information sent by the target NG-RAN 22 is an ID for an individual tunnel or an ID for a shared tunnel with another method of identifying a 5 MBS capability of the target NG-RAN 22. That is, an ID range for the shared tunnel and an ID range for the individual tunnel may be operated separately or an information element (IE) for ID delivery for a shared tunnel may be distinguished by using an IE separately from an ID for the individual tunnel.

Therefore, when a 5 MBS capability of the target NG-RAN 22 is not supported, it is determined to individual delivery, and when a 5 MBS capability of the target NG-RAN 22 is supported, it is determined to shared delivery.

Operations 211, 212 and 213 are shown in 210 in FIG. 2. Accordingly, in operation 211, the SMF 107 may transmit an Nsmf_MBSSession_UpdateSMcontext request message to the MB-SMF 112 by including the corresponding MBS session identifier (ID). Alternatively, the Nsmf_MBSSession_UpdateSMcontext request may include tunnel endpoint information of a PDU session anchor user plane function (PSA-UPF), for example, an address of the UPF and a tunnel identifier (tunnel ID) of the UPF for receiving MBS traffic corresponding to the MBS session ID. In this case, the SMF 107 may include an associated PDU session ID connected with the MBS session ID in the Nsmf_MBSSession_UpdateSMcontext request message.

The MB-SMF 112 that has received the information may transmit the received tunnel endpoint information of the PSA-UPF to the MB-UPF 111 in order to deliver traffic corresponding to the MBS session ID to the PSA-UPF in operation 212. The MB-UPF 111 may transmit a response message including tunnel endpoint information (e.g., MB-UPF address, tunnel ID, lower layer MAC address, and the like) thereof to the MB-SMF 112 in response thereto. In operation 213, the MB-SMF 112 may transmit the information included in the response message of operation 212 to the SMF 107 in response to the request in operation 211.

Accordingly, the SMF 107 that has received the tunnel endpoint information of the MB-UPF 111 may update the PDU session ID connected with the MBS session ID for individual delivery. Further, for this purpose, in operation 221, the SMF 107 may generate an individual tunnel between the PSA-UPF and the MB-UPF 111 for the connected PDU session ID by delivering to the UPF 108 operating as the PSA-UPF. Further, the SMF 107 may transmit tunnel endpoint information of the target NG-RAN received through the AMF 101 in operation 203 to the UPF 108 in operation 221 in order to penetrate to generate an individual tunnel between the target NG-RAN 22 and the UPF 108 operating as a PSA-UPF.

The SMF 107 may transmit the tunnel endpoint information of the target NG-RAN 22 received in operation 203 to the UPF 108; thus, N4 session modification setting up an individual tunnel with the target NG-RAN 22 may be performed separately after operation 204. Accordingly, the UPF 108 may generate an N4 session modification response message and transmit the N4 session modification response message to the SMF 107 in operation 222.

Because Xn handover is completed through operations 223 to 226, when the target NG-RAN 22 does not have an MBS capability, the target NG-RAN 22 may provide smoothly a multicast service to the UE 10 through individual delivery.

When describing this in more detail, the UPF 108 may generate an N3 end marker message to transmit the N3 end marker message to the serving NG-RAN 21 in operation 223, thereby notifying the target NG-RAN 22 of the change of the path. Further, such an N3 End marker message is delivered from the serving NG-RAN 21 to the target NG-RAN 22, so that both the serving NG-RAN 21 and the target NG-RAN 22 may recognize that the path has been changed. Further, the SMF 107 may generate an Nsmf_PDU Session_UpdateSMcontext response message in response to operation 203 and transmit the Nsmf_PDUSession_UpdateSMcontext response message to the AMF 101 in operation 224. Accordingly, the AMF 101 may generate and transmit an N2 path switch request ACK message to the target NG-RAN 22 in operation 225, thereby notifying that N2 path switching has been performed. Thereafter, the target NG-RAN 22 may transmit a release resource message to the serving NG-RAN 21 in operation 226, thereby completing the handover procedure. Accordingly, the path of MBS traffic to be provided to the UE 10 connected to the target NG-RAN 22 is changed from the serving NG-RAN 21 to the target NG-RAN 22.

Figure 3:
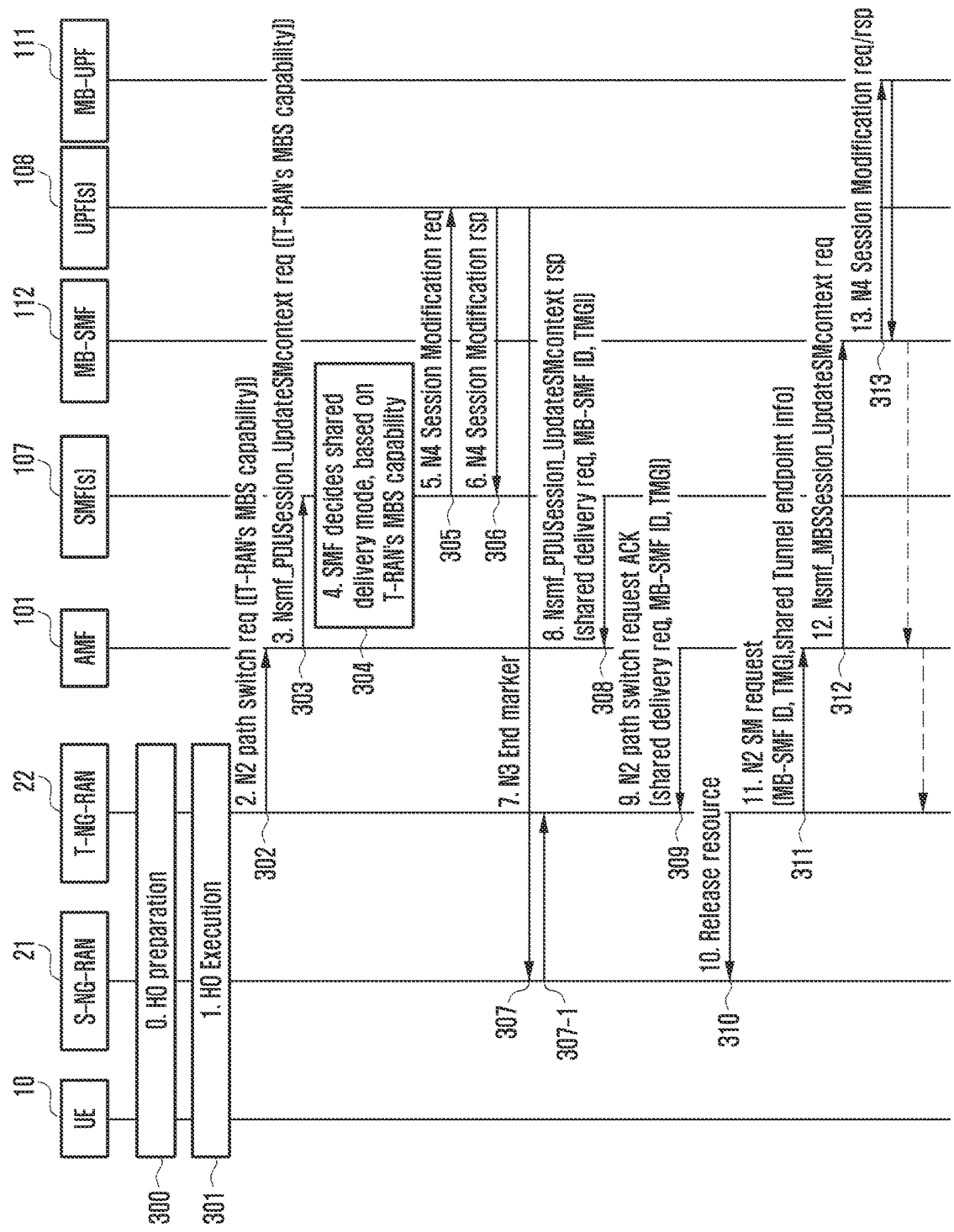
FIG. 3 illustrates a process of supporting Xn handover to a UE in a multicast service according to an embodiment of the disclosure.

FIG. 3 illustrates a process of supporting Xn handover to a UE in a multicast service according to an embodiment of the disclosure.

As described above with reference to FIG. 2, in the description, a serving NG-RAN, which is a serving base station, will be described with reference numeral 21, and a target NG-RAN, which is the target for handover, will be described with reference numeral 22. Further, in the disclosure, there may be a plurality of SMFs, and accordingly, they are indicated as SMF(s). However, it should be noted that reference numeral 107 illustrated in FIG. 1 is used for the SMF for convenience of description. Further, a plurality of UPFs may be used in the disclosure. It is noted that reference numeral 108 illustrated in FIG. 1 is used for the UPF for convenience of description.

Referring to FIG. 3, HO preparation is performed between the serving NG-RAN 21 and the target NG-RAN 22 in operation 300, and Xn handover may be performed through HO execution in operation 301. That is, the UE 10 may perform a handover procedure from the serving NG-RAN 21, which is the base station that was initially provided with the service to the target NG-RAN 22.

The target NG-RAN 22 may transmit an N2 path switch request message to the AMF 101 in operation 302 in order to move a data path flowing to the existing serving NG-RAN 21 to itself. In this case, the N2 path switch request message may be transmitted to the AMF 101 by including the N2 SM message sending to each SMF 107 or MB-SMF 112 for each session. In this case, the target NG-RAN 22 may include an MBS capability indicating whether it supports 5 MBS in the N2 path switch request message.

The SM message may include tunnel endpoint information (address information of the target NG-RAN, tunnel ID, and the like) for the target NG-RAN 22 to receive data traffic for the corresponding session.

Upon receiving the request message in operation 302, the AMF 101 may transmit an Nsmf_PDUSession_UpdateSMcontext request message to the corresponding SMF 107 in operation 303. Here, the Nsmf_PDUSession_UpdateSMcontext request message may include a purpose for the AMF 101 to transmit the SM message to the SMF 107. Further, the Nsmf_PDUSession_UpdateSMcontext request message may include a 5 MBS capability of the target NG-RAN 22 from capability information of the NG-RAN already known by the AMF 101 through a configuration procedure separately from the N2 SM message.

The SMF 107 may determine to use a shared delivery method as a data traffic delivery method corresponding to the MBS session ID in operation 304 according to the 5 MBS capability of the target NG-RAN 22 delivered in operation 303. The SMF 107 may know a 5 MBS capability through the capability transmitted by the target NG-RAN 22 with a method of identifying the 5 MBS capability of the target NG-RAN 22. The SMF 107 may know a 5 MBS capability by distinguishing whether an assigned tunnel ID in the tunnel endpoint information sent by the target NG-RAN 22 is an ID for an individual tunnel or an ID for a shared tunnel with another method of identifying the 5 MBS capability of the target NG-RAN 22. That is, an ID range for the shared tunnel and an ID range for the individual tunnel may be operated separately or an information element (IE) for ID delivery for the shared tunnel may be distinguished by using an IE separately from the ID for the individual tunnel.

Therefore, when a 5 MBS capability of the target NG-RAN 22 is not supported, it is determined to individual delivery, and when a 5 MBS capability of the target NG-RAN 22 is supported, it is determined to shared delivery. Accordingly, the SMF 107 may transmit an N4 session modification request message to the UPF 108 for all PDU sessions in operation 305, and receive an N4 session modification response message from the UPF 108 in operation 306. Further, the UPF 108 may generate an N3 end marker message to transmit the N3 end marker message to the serving NG-RAN 21 in operation 307, thereby notifying the target NG-RAN 22 of the change of the path. Further, such an N3 end marker message is transmitted from the serving NG-RAN 21 to the target NG-RAN 22 in operation 307-1, so that both the serving NG-RAN 21 and the target NG-RAN 22 may recognize that the path has been changed.

For the PDU session connected to the MBS session ID, when the SMF 107 transmits an Nsmf_PDUSession_UpdateSMcontext response message to the AMF 101 in operation 308 in response to the Nsmf_PDUSession_UpdateSMcontext request message in operation 303, the N2 SM message sending to the target NG-RAN 22 may include a shared delivery request, MB-SMF ID, temporary mobile group identity (TMGI) information, and MBS session ID. The information may be transmitted to the target RAN 22 through an N2 path switch request ACK message transmitting again by the AMF 101 in operation 309 in response to operation 302. Accordingly, the target NG-RAN 22 may transmit a release resource message to the serving NG-RAN 21 in operation 310.

Upon receiving the N2 path switch request ACK message in operation 309, the target NG-RAN 22 may transmit a message including the N2 SM message for generating a shared tunnel to the AMF 101 in operation 311 when there is no shared tunnel for the corresponding MBS session ID. The N2 SM message may include at least one of an MBS session ID, TMGI, MB-SMF ID, or target NG-RAN shared tunnel endpoint information (target NG-RAN address, shared tunnel ID, and the like). The MB-SMF ID is delivered to the AMF 101 together with the N2 SM message separately from the N2 SM message so that the AMF 101 may forward the N2 SM message to the MB-SMF 112 corresponding to the MB-SMF ID. Accordingly, in operation 312, the AMF 101 may transmit the Nsmf_MBSSession_UpdateSMcontext request message including the N2 SM message to the MB-SMF 112 by including the corresponding MBS session ID. Accordingly, the MB-SMF 112 may switch MBS data transmitting to the target NG-RAN 22 to shared delivery. For such a shared tunnel, the MB-SMF 112 may generate a tunnel toward the target-RAN 22 for the corresponding MBS session ID through the N4 session modification process to the MB-UPF 111 in operation 313. Further, the MB-SMF 112 may transmit responses to the requests in operations 312 and 311 to complete the handover procedure in operation 313.

According to another embodiment other than the method described above, when the target NG-RAN 22 has a context for the MBS session, and when the target NG-RAN 22 has a shared tunnel for the MBS session, there is no need to perform a separate handover procedure for the corresponding MBS session.

However, when the target NG-RAN 22 receives (stores) a context for the MBS session from the serving NG-RAN 21, if the target NG-RAN 22 does not have a shared tunnel for the MBS session, it may be switched to multicast through shared delivery to the target NG-RAN 22 according to the procedure of FIG. 3 described above.

As another method, when the target NG-RAN 22 supports a 5 MBS capability in operation 302 of FIG. 3 described above, and when the target NG-RAN 22 receives (stores) a context for the MBS session from the serving NG-RAN 21 and knows an address or ID of the MB-SMF 112 serving the corresponding MBS session or TMGI, the target NG-RAN 22 transmits the N2 SM request message for the corresponding MBS session included in the N2 path switch request message of operation 302 to the AMF 101 (the same as operation 311), the AMF 101 transmits the N2 SM request message to the MB-SMF 112, and the MB-SMF 112 transmits the N2 SM request message to the MB-UPF 111 to setup for shared delivery (the same as operations 312 and 313). Therefore, because the shared tunnel was generated, the messages of operations 308 and 309 do not include a shared delivery request, MB-SMF ID, and TMGI information, and operations 311 to 313 are not performed. Xn handover is completed by performing procedures for operations 308 to 310 for a PDU session.

Through the above method, when the target NG-RAN has an MBS capability, the target NG-RAN may smoothly provide the multicast service to the UE through shared delivery.

Figure 4:
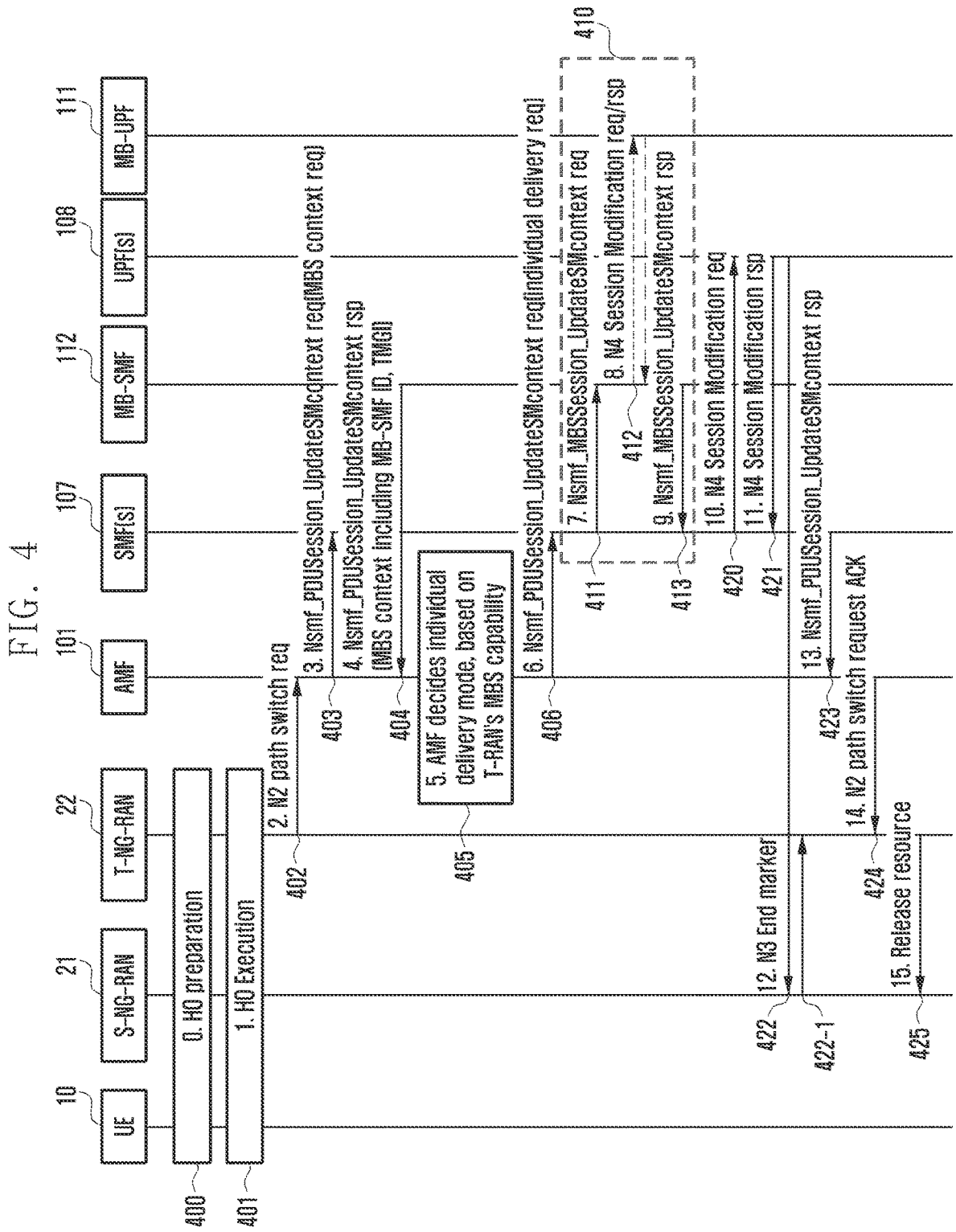
FIG. 4 illustrates a process of supporting Xn handover to a UE in a multicast service according to an embodiment of the disclosure.

FIG. 4 illustrates a process of supporting Xn handover to a UE in a multicast service according to an embodiment of the disclosure.

In the following description, a serving NG-RAN, which is a serving base station, will be described with reference numeral 21, and a target NG-RAN, which is the target for handover, will be described with reference numeral 22. Further, in the disclosure, there may be a plurality of SMFs, and accordingly, they are indicated as SMF(s). However, it should be noted that reference numeral 107 illustrated in FIG. 1 is used for the SMF for convenience of description. Further, a plurality of UPFs may be used in the disclosure. It is noted that reference numeral 108 illustrated in FIG. 1 is used for the UPF for convenience of description.

Referring to FIG. 4, HO preparation may be performed between the serving NG-RAN 21 and the target NG-RAN 22 in operation 400, and Xn handover may be performed through HO execution in operation 401. That is, the UE 10 may perform a handover procedure from the serving NG-RAN 21, which is the base station that was initially provided with the service to the target NG-RAN 22.

The target NG-RAN 22 may transmit an N2 path switch request message to the AMF 101 in operation 402 in order to move a data path flowing to the existing serving NG-RAN 21 to itself. In this case, the N2 path switch request message may be transmitted to the AMF 101 by including the N2 SM message sending to each SMF 107 or MB-SMF 112 for each session.

The SM message may include tunnel endpoint information (address information of the target NG-RAN, tunnel ID, and the like) for the target NG-RAN 22 to receive data traffic for the corresponding session.

The AMF 101 that has received the N2 path switch request message in operation 402 may transmit an Nsmf_PDUSession_UpdateSMcontext request message to the SMF 107 in order to deliver the SM message sending to the SMF 107 in operation 403 to the corresponding SMFs 107.

When the AMF 101 requests an MBS context so as to obtain information for selecting an MBS delivery mode in operation 403 or when the SMF 107 determines (identifies) that the AMF 101 needs to select an MBS delivery mode in operation 403, the SMF 107 may transmit an Nsmf_PDUSession_UpdateSMcontext response message to the AMF 101 in operation 404. The Nsmf_PDUSession_UpdateSMcontext response message may include an MBS context including an MBS session ID or TMGI and ID or address information of an MB-SMF for an MBS session associated with a PDU session.

When determining the delivery mode for the connected PDU session corresponding to the MBS session delivered in operation 402, the AMF 101 may recognize that the target NG-RAN 22 does not have a 5 MBS capability through information already configured with the target NG-RAN 22. In this case, the AMF 101 may determine to support the service for the corresponding MBS session through individual delivery in operation 405.

In this case, while the AMF 101 transmits an Nsmf_PDUSession_UpdateSMcontext request message to the SMF 107 in operation 406 for the connected PDU session for individual delivery, the AMF 101 may transmit a change request to individual delivery for the MBS session ID or PDU session connected to the TMGI to the SMF 107.

Operations 411, 412 and 413 are shown in 410 in FIG. 4. Accordingly, in operation 411, the SMF 107 may transmit the Nsmf_MBSSession_UpdateSMcontext request message to the MB-SMF 112 by including the corresponding MBS session ID. Alternatively, the request in operation 406 may include tunnel endpoint information (e.g., UPF address and tunnel ID) of a PSA-UPF for receiving MBS traffic corresponding to the MBS session ID. In this case, the SMF 107 may include an associated PDU session ID connected with the MBS session ID.

Upon receiving the Nsmf_MBSSession_UpdateSMcontext request message through operation 411, the MB-SMF 112 may transmit the received tunnel endpoint information of the PSA-UPF to the MB-UPF 111 in order to deliver traffic corresponding to the MBS session ID to the PSA-UPF in operation 412. The MB-UPF 111 may provide tunnel endpoint information (e.g., MB-UPF address, tunnel ID, lower layer MAC address, and the like) thereof to the MB-SMF 112 in operation 412 based on the received information. The tunnel endpoint information of the MB-UPF 111 may be provided to the SMF 107 by the MB-SMF 112 in response to the request in operation 406 described above in operation 413.

Upon receiving the tunnel endpoint information of the MB-UPF 111 through operation 413, the SMF 107 may update the PDU session ID connected with the MBS session ID for individual delivery. To this end, in operation 420, the SMF 107 may transmit an N4 session modification request message to the UPF 108. The UPF 108 may generate an N4 session modification response message to transmit the N4 session modification response message to the SMF 107 in operation 421. Operations 420 and 421 may be a case in which the UPF 108 operates as a PSA-UPF. Therefore, an individual tunnel between the PSA-UPF and the MB-UPF 111 may be generated for the PDU session ID to which the UE 10 is connected through operations 420 and 421.

Further, in order to generate an individual tunnel between the target NG-RAN 22 and the PSA-UPF, the SMF 107 may transmit the tunnel endpoint information of the target NG-RAN 22 received in operation 403 or 406 to the UPF 108 in operation 421.

N4 session modification, which transmits the tunnel endpoint information of the target NG-RAN 22 received by the SMF 107 to the UPF 108 in operation 403 or 406 to set up an individual tunnel with the target NG-RAN 22 may be performed separately after operation 404.

In operations 422 and 422-1, the UPF 108 may transmit an N3 end marker to the target NG-RAN 22 through the serving NG-RAN 21. That is, the UPF 108 completes performing the remaining Xn handover, so that when the target NG-RAN 22 does not have an MBS capability, the target NG-RAN 22 may smoothly provide a multicast service to the UE 10 through individual delivery.

Thereafter, in operation 423, the SMF 107 may generate and transmit an Nsmf_PDUSession_UpdateSMcontext response message in response to the Nsmf_PDUSession_UpdateSMcontext request message in operation 406. Therefore, the AMF 101 may transmit an N2 path switch request ACK message to the target NG-RAN 22 in operation 424 to notify that the remaining Xn handover has been completed.

Accordingly, the target NG-RAN 22 may transmit a release resource message to the source NG-RAN 21 to instruct the source NG-RAN 21 to release the resource allocated to the UE 10 in operation 425.

Figure 5:
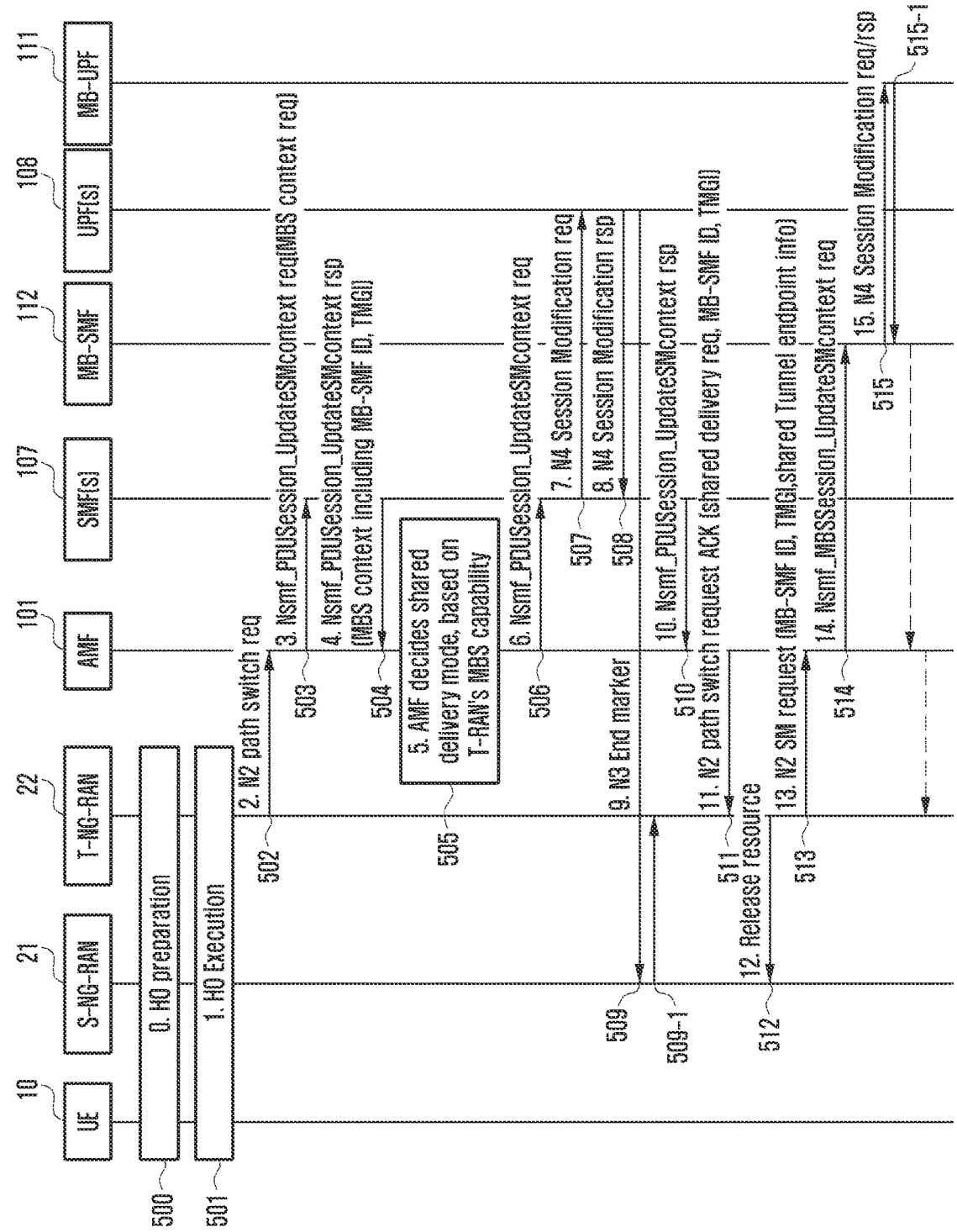
FIG. 5 illustrates a process of supporting Xn handover to a UE in a multicast service according to an embodiment of the disclosure.

FIG. 5 illustrates a process of supporting Xn handover to a UE in a multicast service according to an embodiment of the disclosure.

Referring to FIG. 5, as previously described in FIG. 2, a serving NG-RAN, which is a serving base station, will be described with reference numeral 21, and a target NG-RAN, which is the target for handover, will be described with reference numeral 22. Further, in the disclosure, there may be a plurality of SMFs, and accordingly, they are indicated as SMF(s). However, it should be noted that reference numeral 107 illustrated in FIG. 1 is used for the SMF for convenience of description. Further, a plurality of UPFs may be used in the disclosure. It is noted that reference numeral 108 illustrated in FIG. 1 is used for the UPF for convenience of description.

With reference to FIG. 5, HO preparation may be performed between the serving NG-RAN 21 and the target NG-RAN 22 in operation 500. Further, in operation 501, Xn handover may be performed through HO execution. That is, the UE 10 may perform a handover procedure from the serving NG-RAN 21, which is the base station that was initially provided with the service to the target NG-RAN 22.

The target NG-RAN 22 may transmit an N2 path switch request message to the AMF 101 in operation 502 in order to deliver a data path flowing to the existing serving NG-RAN 21 to itself. In this case, the N2 path switch request message may be transmitted to the AMF 101 by including the N2 SM message sending to each SMF 107 or MB-SMF 112 for each session.

The SM message may include tunnel endpoint information (address information of the target NG-RAN, tunnel ID, and the like) for the target NG-RAN 22 to receive data traffic for the corresponding session.

The AMF 101 that has received the request in operation 502 may transmit an Nsmf_PDUSession_UpdateSMcontext request message to the corresponding SMFs 107 in order to deliver the SM message sending to the SMF 107 in operation 503.

When the AMF 101 requests an MBS context so as to obtain information for selecting an MBS delivery mode in operation 503 or when the SMF 107 recognizes (determines or identifies) that the MBS delivery mode selection is necessary to the AMF 101 in operation 503, the SMF 107 may transmit an Nsmf_PDUSession_UpdateSMcontext response message to the AMF 101 in operation 504. The Nsmf_PDUSession_UpdateSMcontext response message may include an MBS context including an MBS session ID or TMGI and ID or address information of MB-SMF for an MBS session associated with a PDU session.

When determining a delivery mode for the connected PDU session corresponding to the MBS session received through operation 504, the AMF 101 may recognize that the target NG-RAN 22 has a 5 MBS capability through information already configured with the target NG-RAN 22. In this case, the AMF 101 may determine to support the service for the corresponding MBS session through shared delivery in operation 505.

In operation 506, the AMF 101 may include information on shared delivery in the Nsmf_PDUSession_UpdateSMcontext request message and transmit the Nsmf_PDUSession_UpdateSMcontext request message to the SMF 107. Therefore, the SMF 107 may include information on shared delivery in the N4 session modification request message and transmitting the message to the UPF 108 in operation 507, thereby notifying the UPF 108 of this. Upon receiving the N4 session modification request message in operation 507, the UPF 108 may generate an N4 session modification response message to respond to the SMF 107 in operation 508. Further, the UPF 108 may transmit an N3 End marker to the target NG-RAN 22 in operations 509 and 509-1 through the source NG-RAN 21 based on the N4 session modification request message received in operation 507.

The SMF 107 may generate an Nsmf_PDUSession_UpdateSMcontext response message in response to the Nsmf_PDUSession_UpdateSMcontext request message in operation 506 and transmit the Nsmf_PDUSession_UpdateSMcontext response message to the AMF 101 in operation 510.

After receiving the Nsmf_PDUSession_UpdateSMcontext response message in operation 510, the AMF transmits an N2 path switch request ACK message to the target NG-RAN 22 in operation 511, thereby transmitting a shared delivery request, information on an MBS session ID or TMGI, and MB-SMF ID to the target RAN.

The target NG-RAN 22 that has received the N2 path switch request ACK message transmits a release resource message to the source NG-RAN 21 in operation 512, and enables the source NG-RAN 21 to release a resource allocated to the UE 10. Thereafter, when there is no shared tunnel for the corresponding MBS session ID based on the message received in operation 511, in order to generate a shared tunnel, the target NG-RAN 22 may transmit a message including the N2 SM message to the AMF 101 in operation 513. The N2 SM message may include an MBS session ID or TMGI, MB-SMF ID, and shared tunnel endpoint information of the target NG-RAN (address of the target NG-RAN, shared tunnel ID, and the like). Further, the MB-SMF ID is delivered to the AMF 101 together with the N2 SM message separately from the N2 SM message, so that the AMF 101 may forward the N2 SM message to the MB-SMF 112 corresponding to the MB-SMF ID in operation 514. Accordingly, in operation 514, the AMF 101 may transmit an Nsmf_MBSSession_UpdateSMcontext request message including the N2 SM message to the MB-SMF 112 by including the corresponding MBS session ID. Accordingly, the MB-SMF 112 switches data transmission corresponding to the MBS session ID to shared delivery, and in order to generate a shared tunnel, the MB-SMF 112 may generate a tunnel toward the target-RAN 22 for the corresponding MBS session ID through a process of transmitting an N4 session modification request to the MB-UPF 111 and receiving an N4 session modification response in operations 515 and 515-1. Further, the MB-SMF 112 may generate a response to operation 514 and transmit the response to the AMF 101, and the AMF 101 may generate a response to the request in operation 513 to transmit the response to the target NG-RAN 22, thereby completing a handover procedure.

According to a modified embodiment of the form described in FIG. 5, when the target NG-RAN 22 has a warning having a context for the MBS session and a shared tunnel for the MBS session in the target NG-RAN 22, there is no need to perform a separate handover procedure for the corresponding MBS session.

However, when the target NG-RAN 22 receives (stores) a context for the MBS session from the serving NG-RAN 21, and there is no shared tunnel for the MBS session in the target NG-RAN 22, it may be switched to multicast through shared delivery to the target NG-RAN 22 according to the procedure of FIG. 5.

As another example, in operation 502 of FIG. 5, because the target NG-RAN 22 supports a 5 MBS capability and receives (stores) a context for the MBS session from the serving NG-RAN 21, when the target NG-RAN 22 knows an address or ID of MB-SMF serving the corresponding MBS session or TMGI, the target NG-RAN 22 transmits an N2 SM request message for the corresponding MBS session and the N2 path switch request message in operation 502 to the AMF 101 (the same as operation 513), the AMF 101 transmits the N2 SM request message to the MB-SMF 112, and the MB-SMF 112 transmits the N2 SM request message to the MB-UPF 111 to perform setup for shared delivery (the same as operations 514 and 515). Therefore, because the shared tunnel was generated, the message in operation 511 does not include a shared delivery request, MB-SMF ID, TMGI information, and the like, and operations 513 to 515 are not performed. Xn handover may be completed by performing the procedure for operations 510 to 512 for a PDU session.

Through the above method, when the target NG-RAN 22 has an MBS capability, the target NG-RAN 22 may smoothly provide the multicast service to the UE 10 through shared delivery.

Figure 6:
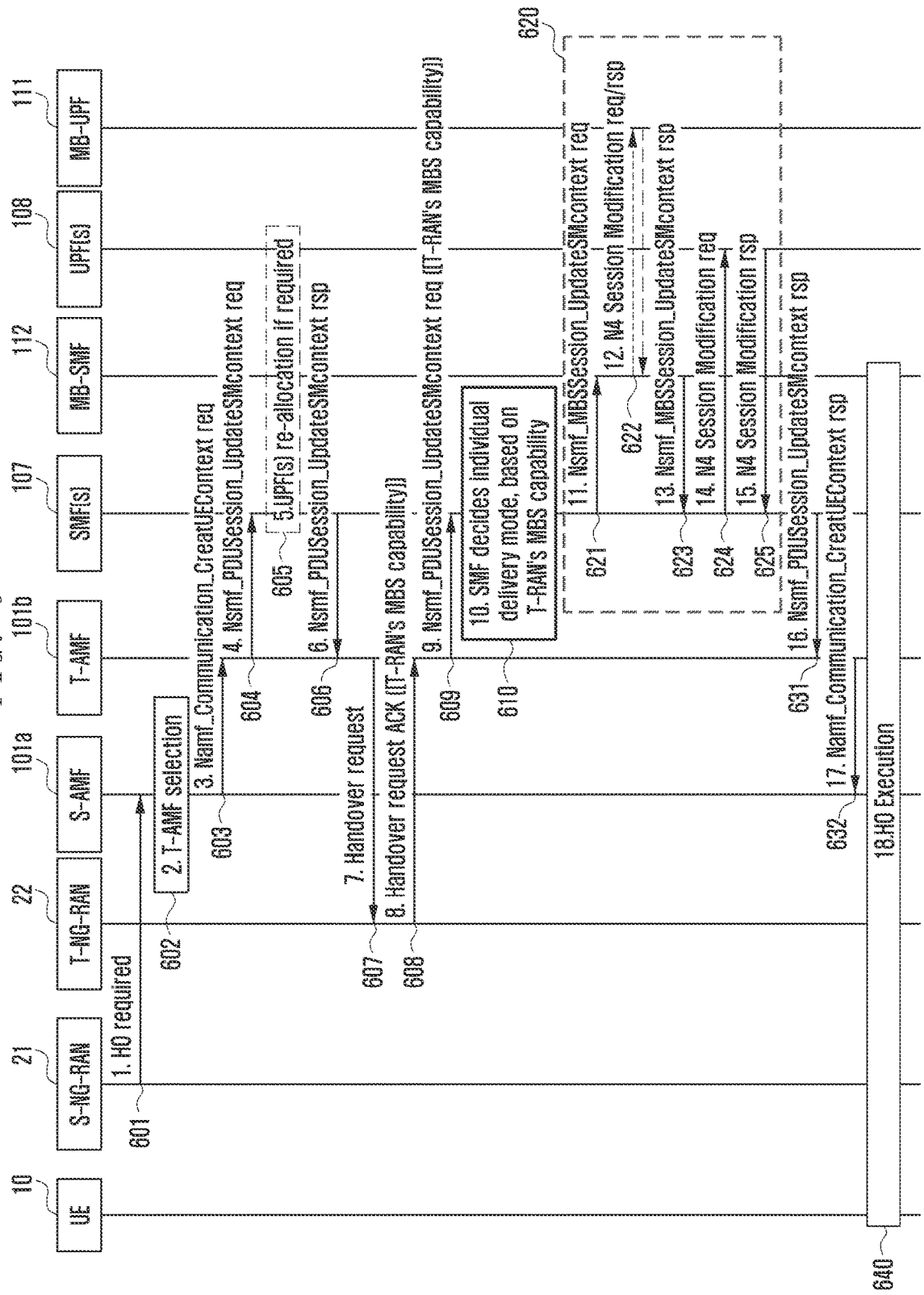
FIG. 6 illustrates a process of supporting N2 handover to a UE in a multicast service according to an embodiment of the disclosure.

FIG. 6 illustrates a process of supporting N2 handover to a UE in a multicast service according to an embodiment of the disclosure.

In the following description, a serving NG-RAN, which is a serving base station, will be described with reference numeral 21, and a target NG-RAN, which is the target for handover, will be described with reference numeral 22. Further, in the disclosure, there may be a plurality of SMFs, and accordingly, they are indicated as SMF(s). However, it should be noted that reference numeral 107 illustrated in FIG. 1 is used for the SMF for convenience of description. Further, a plurality of UPFs may be used in the disclosure. It is noted that reference numeral 108 illustrated in FIG. 1 is used for the UPF for convenience of description. Further, in the flowchart of FIG. 6, the serving AMF and the target AMF to be handover exist. Accordingly, reference numeral 101*a* is assigned to the serving AMF, and reference numeral 101*b* is assigned to the target AMF.

Referring to FIG. 6, when the UE 10 receiving a multicast service is determined to perform N2-based handover in the serving NG-RAN 21 during a handover process, the UE 10 prepares handover through a process up to operation 632 illustrated in FIG. 6 through a handover preparation process, and when the preparation is completed, handover may be performed by actually executing the handover through HO execution and through operation 640. This will be described in detail through the following description.

The serving NG-RAN 21 may transmit an HO required message to the serving AMF 101*a* in operation 601. Accordingly, the serving AMF 101*a* may select the target AMF 101*b* to be moved to in operation 602. The serving AMF 101*a* may transmit a Namf_communication_CreatUEContext request message to the target AMF 101*b* in operation 603. Thereafter, the target AMF 101*b* that has received the Namf_communication_CreatUEContext request message may transmit an Nsmf_PDUSession_UpdateSMcontext request message to the corresponding SMF 107 for each PDU session in operation 604. Therefore, the SMF 107 may perform UPF re-allocation, if required in operation 605. The SMF 107 that has performed operation 605 or that has not performed operation 605 because it is not necessary, may transmit a Namf_communication_CreatUEContext response message to the target AMF 101*b* in operation 606. Accordingly, the target AMF 101*b* may recognize that handover of the UE 10 receiving the MBS has been requested.

The target AMF 101*b* may transmit a handover request to the target NG-RAN 22 in operation 607. The target NG-RAN 22 may generate a response to the handover request to transmit the response to the target AMF 101*b* in operation 608. When the target NG-RAN 22 responds with a Handover request ACK, the target NG-RAN 22 may notify the target AMF 101*b* of whether the target NG-RAN 22 supports a 5 MBS capability. The target NG-RAN 22 may transmit an N2 SM message sending to each SMF 107 for each PDU session to the target AMF 101*b*, in this case, the N2 SM message may include an MBS capability indicating whether the target NG-RAN 22 supports 5 MBS.

The SM message may include tunnel endpoint information (address information of the target NG-RAN, tunnel ID, and the like) for the target NG-RAN 22 to receive data traffic for the corresponding session.

The target AMF 101*b* that has received the request in operation 608 may transmit an Nsmf_PDUSession_UpdateSMcontext request message to the corresponding SMFs 107 in order to deliver the SM message sending to the SMF 107 in operation 609. The Nsmf_PDUSession_UpdateSMcontext request message may include a 5 MBS capability of the target NG-RAN 22 from capability information of the NG-RAN already known by the target AMF 101*b* through a configuration operation separately from the N2 SM message.

The SMF 107 may determine to use an individual delivery method as a data traffic delivery method corresponding to the MBS session ID in operation 610 according to the 5 MBS capability of the target NG-RAN 22. The SMF 107 may know a 5 MBS capability through the capability sent by the target NG-RAN 22 with a method of identifying the 5 MBS capability of the target NG-RAN 22 or may know a 5 MBS capability by distinguishing whether an assigned tunnel ID in information of the tunnel endpoint sending by the target NG-RAN 22 is an ID for an individual tunnel or an ID for a shared tunnel. That is, an ID range for the shared tunnel and an ID range for the individual tunnel may be operated separately or an information element (IE) for ID delivery for the shared tunnel may be distinguished by using an IE separately from the ID for the individual tunnel.

Therefore, when the 5 MBS capability of the target NG-RAN 22 is not supported, it may be determined to individual delivery, and when the 5 MBS capability of the target NG-RAN 22 is supported, it may be determined to shared delivery.

Operations 621, 622, 623, 624 and 625 are shown in 620 in FIG. 6. Accordingly, in operation 621, the SMF 107 may transmit an Nsmf_MBSSession_UpdateSMcontext request message to the MB-SMF 112 by including the corresponding MBS session ID. Alternatively, the Nsmf_MBSSession_UpdateSMcontext request message may include tunnel endpoint information (e.g., UPF address and tunnel ID) of the PSA-UPF for receiving MBS traffic corresponding to the MBS session ID. In this case, the SMF 107 may include an associated PDU session ID connected with the MBS session ID.

Upon receiving the information, the MB-SMF 112 transmits the received tunnel endpoint information of the PSA-UPF to the MB-UPF 111 so that traffic corresponding to the MBS session ID may be transmitted to the PSA-UPF in operation 622, and the MB-UPF 111 may transmit tunnel endpoint information (e.g., MB-UPF address, tunnel ID, lower layer MAC address, and the like) thereof to the MB-SMF 112. The information may be transmitted to the SMF 107 in response to the request in operation 621 in operation 623. Accordingly, the SMF 107 that has received tunnel endpoint information of the MB-UPF 111 may update a PDU session ID connected with the MBS session ID for individual delivery and for update, in operation 624, the SMF 107 may transmit the PDU session ID to the PSA-UPF to generate an individual tunnel between the PSA-UPF and the MB-UPF for the connected PDU session ID.

In order to generate an individual tunnel between the target NG-RAN 22 and the PSA-UPF, the SMF 107 may transmit the tunnel endpoint information of the target NG-RAN 22 received in operation 609 to the UPF 108 in operation 624.

N4 session modification request in operation 624, which delivers the tunnel endpoint information of the target NG-RAN 22 received in operation 609 to the UPF 108 to set an individual tunnel with the target NG-RAN 22 and receive the N4 session modification response in operation 625, may be separately performed in operation 640.

When the remaining N2 handover preparation process is completed in operations 631 and 632 and the HO execution process is performed in operation 640, if the target NG-RAN 22 does not have an MBS capability, the target NG-RAN 22 may smoothly provide a multicast service to the UE 10 through individual delivery.

Figure 7:
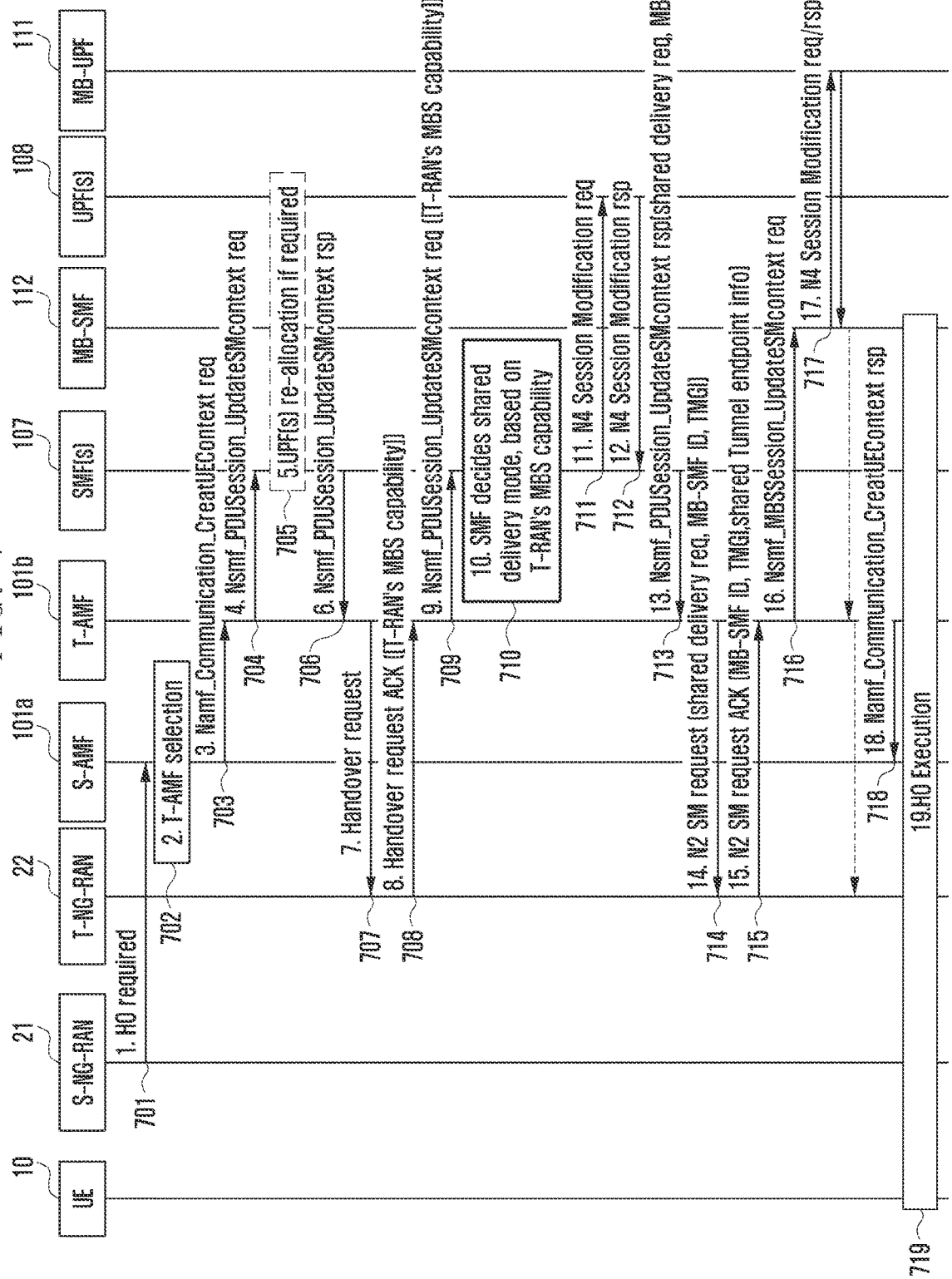
FIG. 7 illustrates a process of supporting N2 handover to a UE in a multicast service according to an embodiment of the disclosure.

FIG. 7 illustrates a process of supporting N2 handover to a UE in a multicast service according to an embodiment of the disclosure.

In the following description, a serving NG-RAN, which is a serving base station, will be described with reference numeral 21, and a target NG-RAN, which is the target for handover, will be described with reference numeral 22. Further, in the disclosure, there may be a plurality of SMFs, and accordingly, they are indicated as SMF(s). However, it should be noted that reference numeral 107 illustrated in FIG. 1 is used for the SMF for convenience of description. Further, a plurality of UPFs may be used in the disclosure. It is noted that reference numeral 108 illustrated in FIG. 1 is used for the UPF for convenience of description. Further, in the flowchart of FIG. 7, the serving AMF and the target AMF to be handover exist. Accordingly, reference numeral 101*a* is assigned to the serving AMF, and reference numeral 101*b* is assigned to the target AMF.

Referring to FIG. 7, when the UE 10 receiving a multicast service is determined to perform N2-based handover in the serving NG-RAN 21 during a handover process, the UE 10 prepares handover through a handover preparation process and through the process up to operation 718, and when the handover preparation is completed, handover may be performed through a process of actually executing handover through HO execution in operation 719. This will be described in detail through the following description.

The serving NG-RAN 21 may transmit an HO required message to the serving AMF 101*a* in operation 701, and the serving AMF 101*a* may select a target AMF 101*b* to be moved in operation 702. The serving AMF 101*a* may transmit a Namf_communication_CreatUEContext request message to the target AMF 101*b* in operation 703, and perform operations 704, 705 and 706 for the SMF 107 and the UPF 108 for each PDU session, and then the target AMF 101*b* may transmit a handover request message to the target NG-RAN 22 in operation 707.

In response to the request in operation 707, the target NG-RAN 22 may generate a response message and transmit the response message to the target AMF 101*b* in operation 708. When the target NG-RAN 22 responds with a handover request ACK, the target NG-RAN 22 may notify the target AMF 101*b* of whether the target NG-RAN 22 supports a 5 MBS capability. The target NG-RAN 22 may transmit the N2 SM message sending to each SMF 107 to the target AMF 101*b* for each PDU session. In this case, the target NG-RAN 22 may include whether an MBS capability is supported indicating whether the target NG-RAN 22 supports 5 MBS.

The SM message may include tunnel endpoint information (address information of the target NG-RAN, tunnel ID, and the like) for the target NG-RAN 22 to receive data traffic for the corresponding session.

The target AMF 101*b* that has received the request may transmit an Nsmf_PDUSession_UpdateSMcontext request message to the corresponding SMFs 107 in order to deliver the SM message sending to the SMF 107 in operation 709. The Nsmf_PDUSession_UpdateSMcontext request message may include a 5 MBS capability of the target NG-RAN 22 from capability information of the NG-RAN already known by the target AMF 101*b* through a configuration or the like separately from the N2 SM message.

The SMF 107 may determine to use a shared delivery method as a data traffic delivery method corresponding to the MBS session ID in operation 710 according to the received 5 MBS capability of the target NG-RAN 22. The SMF 107 may know a 5 MBS capability through the capability sending by the target NG-RAN 22 with a method of identifying the 5 MBS capability of the target NG-RAN 22 or may know a 5 MBS capability by distinguishing whether an assigned tunnel ID is an ID for an individual tunnel or an ID for a shared tunnel in information of the tunnel endpoint sending by the target NG-RAN 22. That is, an ID range for the shared tunnel and an ID range for the individual tunnel may be operated separately or an information element (IE) for ID delivery for the shared tunnel may be distinguished by using an IE separately from the ID for the individual tunnel.

Therefore, when the 5 MBS capability of the target NG-RAN 22 is not supported, it may be determined to individual delivery, and when the 5 MBS capability of the target NG-RAN 22 is supported, it may be determined to shared delivery.

For the PDU session connected to the MBS Session ID, when the SMF 107 transmits an Nsmf_PDUSession_UpdateSMcontext response message in response to the Nsmf_PDUSession_UpdateSMcontext request message of operation 709 in operation 713, the Nsmf_PDUSession_UpdateSMcontext response message may include at least one of a shared delivery request, MB-SMF ID, TMGI information, or MBS session ID as an N2 SM message sending to the target NG-RAN 22. The information may be transmitted again to the target RAN 22 through the N2 SM request message of operation 714 by the target AMF 101b.

When there is no shared tunnel for the corresponding MBS session ID, the target NG-RAN 22 that has received the information may transmit a message including an N2 SM message for generating a shared tunnel to the target AMF 101b in operation 715. The N2 SM message may include at least one of the MBS session ID, TMGI, MB-SMF ID, or target NG-RAN shared tunnel endpoint information (target NG-RAN address, shared tunnel ID, and the like). Further, the MB-SMF ID is delivered to the target AMF 101b together with the N2 SM message separately from the N2 SM message, so that the target AMF 101b may forward the N2 SM message to the MB-SMF 112 corresponding to the MB-SMF ID. Accordingly, in operation 716, the target AMF 101b may transmit an Nsmf_MBSSession_UpdateSMcontext request message including the N2 SM message to the MB-SMF 112 by including the corresponding MBS session ID. Accordingly, the MB-SMF 112 switches to the shared delivery, and for the shared tunnel for this, in operation 717, the MB-SMF 112 may generate a tunnel toward the target-RAN 22 for the corresponding MBS session ID through an N4 session modification process to the MB-UPF 111. Further, the MB-SMF 112 and the target AMF 101b may transmit respective responses to the requests in operations 716 and 715. Because the target AMF 101b transmits a response to the message in operation 703 to the serving AMF 101a in operation 718, the target AMF 101b may complete the handover preparation procedure and perform the HO execution procedure in operation 719.

According to another embodiment of FIG. 7, when the target NG-RAN 22 has (stores) a context for the MBS session, and the target NG-RAN 22 has a shared tunnel for the MBS session, there is no need to perform a separate handover procedure for the corresponding MBS session.

However, when the target NG-RAN 22 receives (stores) a context for the MBS session from the serving NG-RAN 21, and there is no shared tunnel for the MBS session in the target NG-RAN 22, it is possible to switch to multicast through shared delivery to the target NG-RAN according to the procedure of FIG. 7.

As another method, in operation 708 of FIG. 7, because the target NG-RAN 22 supports a 5 MBS capability and receives (stores) a context for the MBS session from the serving NG-RAN 21, when the target NG-RAN 22 knows an address or ID of MB-SMF serving the MBS session or TMGI, the target NG-RAN 22 may transmit an N2 SM request message for the corresponding MBS session and the handover request ACK message in operation 708 to the target AMF 101b (the same as operation 715), the target AMF 101b may transmit the N2 SM request message to the MB-SMF 112, and the MB-SMF 112 may transmit the N2 SM request message to the MB-UPF 111 to perform setup for shared delivery (the same as operations 716 and 717). Therefore, because the shared tunnel was generated, the MB-SMF ID and TMGI information are not included in the shared delivery request in the messages of operations 713 and 714, and operations 715 to 717 are not performed. HO preparation for N2 handover may be completed by performing the procedures for operations 711, 712, 713 and 718 for a PDU session.

After the HO preparation is completed as described above, in operation 719, the serving AMF 101a transmits a HO command to the serving NG-RAN 21, thereby executing the HO execution process.

Through the above method, when the target NG-RAN 22 has an MBS capability, the target NG-RAN may smoothly provide the multicast service to the UE through shared delivery.

Figure 8:
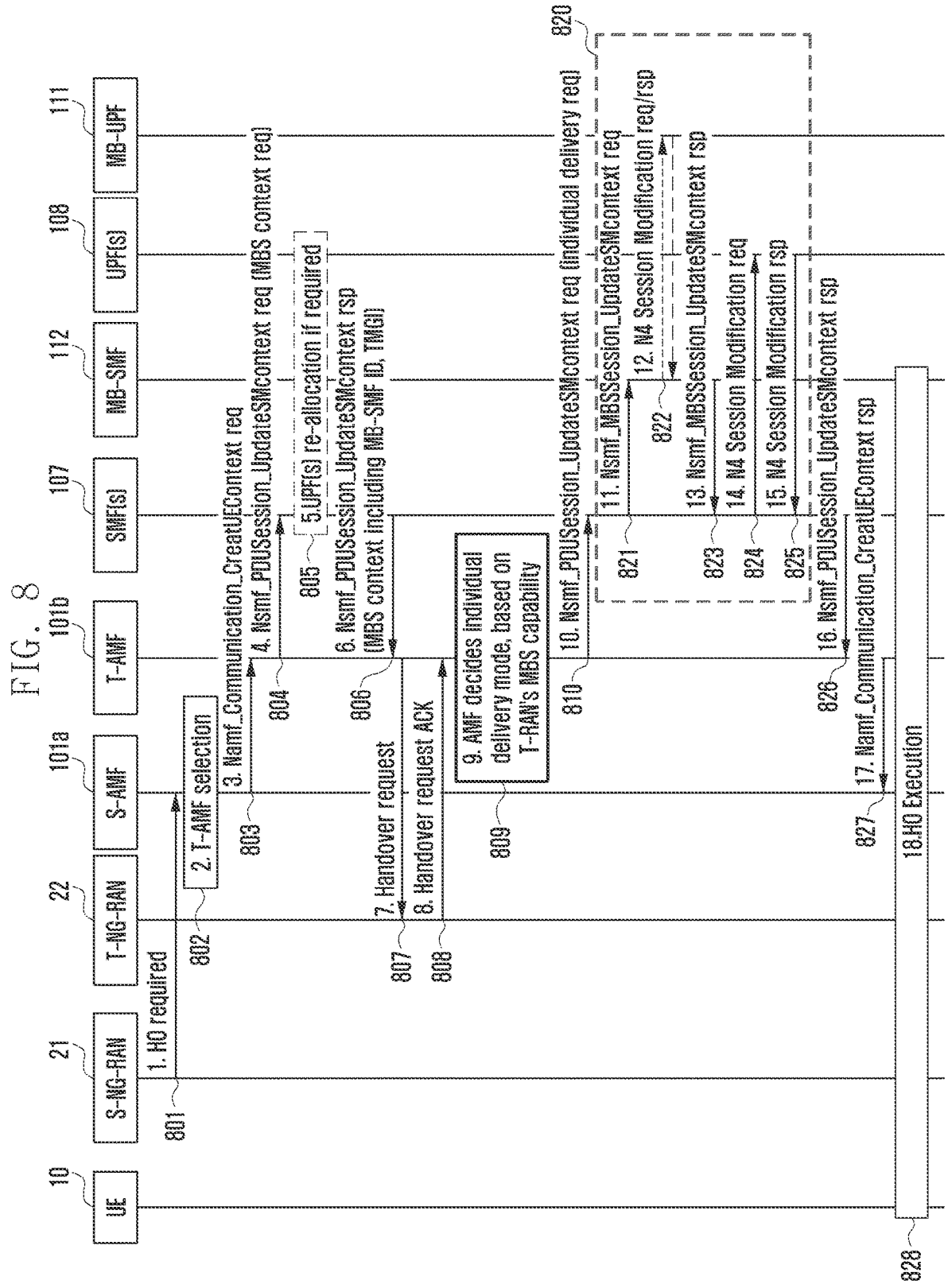
FIG. 8 illustrates a process of supporting N2 handover to a UE in a multicast service according to an embodiment of the disclosure.

FIG. 8 illustrates a process of supporting N2 handover to a UE in a multicast service according to an embodiment of the disclosure.

In the following description, a serving NG-RAN, which is a serving base station, will be described with reference numeral 21, and a target NG-RAN, which is the target for handover, will be described with reference numeral 22. Further, in the disclosure, there may be a plurality of SMFs, and accordingly, they are indicated as SMF(s). However, it should be noted that reference numeral 107 illustrated in FIG. 1 is used for the SMF for convenience of description. Further, a plurality of UPFs may be used in the disclosure. It is noted that reference numeral 108 illustrated in FIG. 1 is used for the UPF for convenience of description. Further, in the flowchart of FIG. 8, the serving AMF and the target AMF to be handover exist. Accordingly, reference numeral 101a is assigned to the serving AMF, and reference numeral 101b is assigned to the target AMF.

Referring to FIG. 8, when the UE 10 receiving a multicast service is determined to perform N2-based handover in the serving NG-RAN 21 during a handover process, the UE 10 prepares handover through a handover preparation process and through a process up to operation 827, and when handover preparation is completed, handover occurs through a process of actually executing handover through HO execution in operation 828. Hereinafter, this will be described in detail through the following description.

The serving NG-RAN 21 may transmit an HO required message to the serving AMF 101a in operation 801, and the serving AMF 101a may select the target AMF 101b to be moved in operation 802. The serving AMF 101a transmits the Namf_communication_CreatUEContext request message to the target AMF 101b in operation 803, and in order to deliver the SM message sending to the SMF 107 in operation 804 to the SMFs 107 managing each PDU session, the target AMF 101b may transmit to the SMF 107 the Nsmf_PDUSession_UpdateSMcontext request message. The SMF 107 may perform UPF re-allocation, if required in step operation 805.

When the target AMF 101b requests an MBS context in order to obtain information for selecting an MBS delivery mode in operation 804 or when the SMF 107 recognizes that the target AMF 101b needs to select an MBS delivery mode in operation 804, the SMF 107 may transmit an Nsmf_PDUSession_UpdateSMcontext response to the target AMF 101b in operation 806. In this case, the Nsmf_PDUSession_UpdateSMcontext response message may include an MBS context including an MBS session ID or TMGI and an ID of the MB-SMF 112 or address information of the MB-SMF 112 for an MBS session associated with a PDU session.

Through operations 807 and 808, the target AMF 101b may transmit a handover request message to the target NG-RAN 22 and receive a response thereof. In determining a delivery mode for the MBS session connected to the PDU session, the target AMF 101b may recognize that the target NG-RAN 22 does not have a 5 MBS capability through information already configured with the target NG-RAN 22 and in operation 809, the target AMF 101b may determine to support the service for the corresponding MBS session through individual delivery.

In this case, the target AMF 101b may transmit a change request message to individual delivery for a PDU session connected to the TMGI or the MBS session ID to the SMF 107 while transmitting the Nsmf_PDUSession_UpdateSMcontext request message to the SMF 107 in operation 810 for the connected PDU session for individual delivery.

Operations 821, 822, 823, 824 and 825 are shown in 820 in FIG. 8. Accordingly, in operation 821, the SMF 107 may transmit an Nsmf_MBSSession_UpdateSMcontext request message to the MB-SMF 112 by including the corresponding MBS session ID. Further, the Nsmf_MBSSession_UpdateSMcontext request message may include tunnel endpoint information (e.g., UPF address and tunnel ID) of a PSA-UPF for receiving MBS traffic corresponding to the MBS session ID. In this case, the SMF 107 may include an associated PDU session ID connected with the MBS session ID.

Upon receiving the information, the MB-SMF 112 may transmit the received tunnel endpoint information of the PSA-UPF to the MB-UPF 111 in order to transmit traffic corresponding to the MBS session ID to the PSA-UPF and transmit tunnel endpoint information (e.g., MB-UPF address, tunnel ID, lower layer MAC address, and the like) of the MB-UPF 111 to the MB-SMF 112 in operation 822. In operation 823, the MB-SMF 112 may transmit the information to the SMF 107 in response to the request in operation 821. Accordingly, the SMF 107 that has received the tunnel endpoint information of the MB-UPF 111 may update the PDU session ID connected with the MBS session ID for individual delivery, and for this purpose, in operations 814 and 815, the SMF 107 may transmit the PDU session ID to the PSA-UPF to generate an individual tunnel between the PSA-UPF and the MB-UPF for the connected PDU session ID.

In order to generate an individual tunnel between the target NG-RAN 22 and the PSA-UPF, the SMF 107 may transmit the tunnel endpoint information of the target NG-RAN 22 received in operations 808 and 810 to the UPF 108 in operation 824 and receive the N4 session modification response in operation 825.

The UPF 108 transmits the tunnel endpoint information of the target NG-RAN 22 received in operations 808 and 810 to the UPF 108; thus, N4 session modification for setting an individual tunnel with the target NG-RAN 22 may be performed separately.

In operations 826 and 827, the SMF 107 and the target AMF 101b may complete the remaining N2 handover preparation process and execute an HO execution process in operation 828, so that when the target NG-RAN 22 does not have an MBS capability, the target NG-RAN 22 may smoothly provide a multicast service to the UE 10 through individual delivery.

Figure 9:
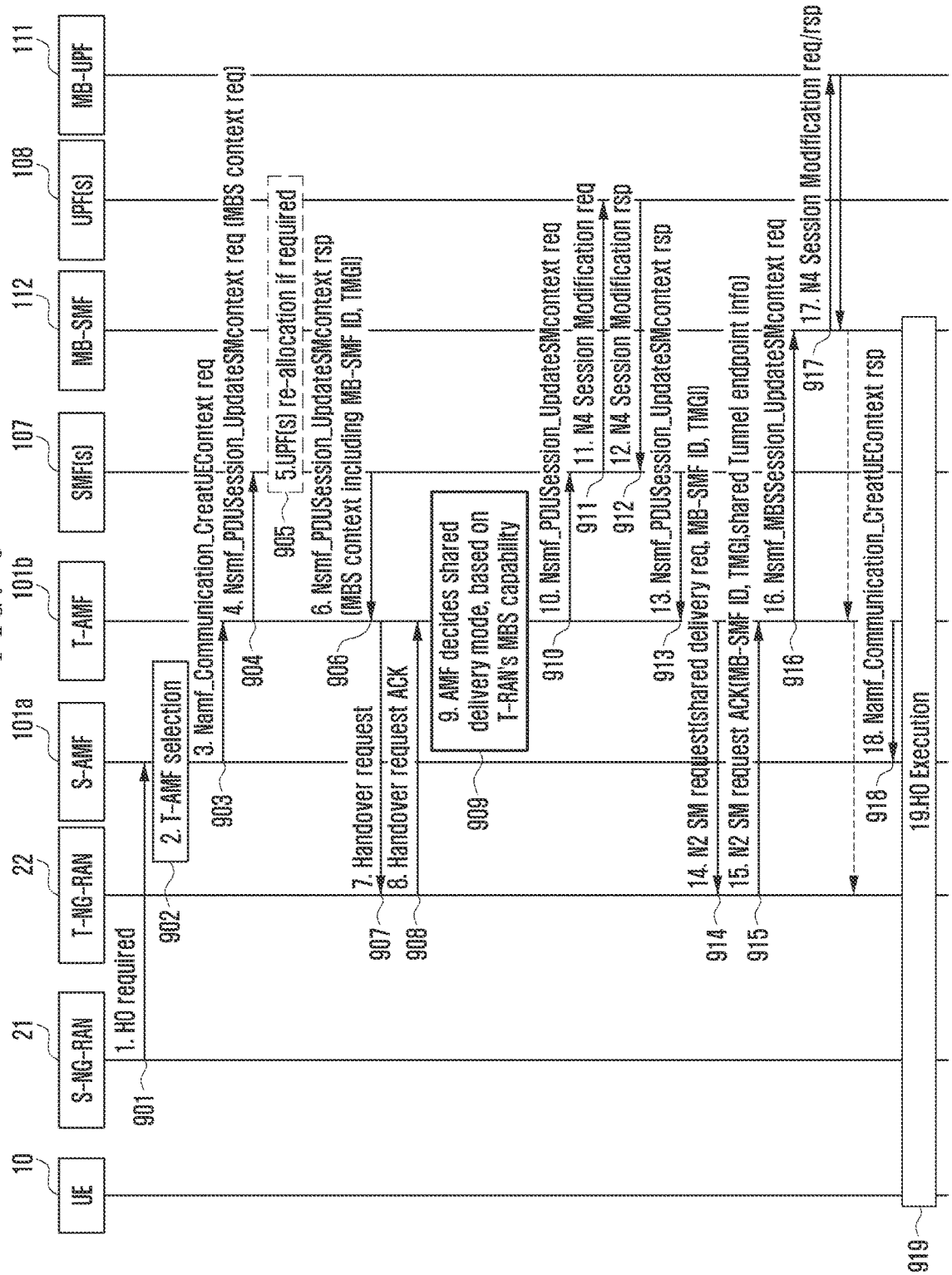
FIG. 9 illustrates a process of supporting N2 handover to a UE in a multicast service according to an embodiment of the disclosure.

FIG. 9 illustrates a process of supporting N2 handover to a UE in a multicast service according to an embodiment of the disclosure.

In the following description, a serving NG-RAN, which is a serving base station, will be described with reference numeral 21, and a target NG-RAN, which is the target for handover, will be described with reference numeral 22. Further, in the disclosure, there may be a plurality of SMFs, and accordingly, they are indicated as SMF(s). However, it should be noted that reference numeral 107 illustrated in FIG. 1 is used for the SMF for convenience of description. Further, a plurality of UPFs may be used in the disclosure. It is noted that reference numeral 108 described with reference to FIG. 1 is used for the UPF for convenience of description. Further, in the flowchart of FIG. 9, the serving AMF and the target AMF to be handover exist. Accordingly, reference numeral 101a is assigned to the serving AMF, and reference numeral 101b is assigned to the target AMF.

Referring to FIG. 9, when the UE 10 receiving a multicast service is determined to perform N2-based handover in the serving NG-RAN 21 during a handover process, the UE 10 prepares handover through a process up to operation 917 and through a handover preparation process, when handover preparation is completed, handover occurs through a process of actually executing handover through HO execution in operation 918. This will be described in detail through the following description.

The serving NG-RAN 21 may transmit an HO required message to the serving AMF 101a in operation 901, and the serving AMF 101a may select a target AMF 101b to be moved in operation 902. In operation 903, the serving AMF 101a transmits the Namf_communication_CreatUEContext request message to the target AMF 101b, and the target AMF 101b may transmit an Nsmf_PDUSession_UpdateSMcontext request message to the SMFs 107 managing each PDU session to the SMF 107 in order to deliver the SM message to the SMF 107 in operation 904. The SMF 107 may perform UPF re-allocation, if required in step operation 905.

When the target AMF 101b requests an MBS context in order to obtain information for selecting an MBS delivery mode in operation 904 or when the SMF 107 recognizes that it is necessary to select an MBS delivery mode to the target AMF 101b in operation 904, the SMF 107 may transmit an Nsmf_PDUSession_UpdateSMcontext response message to the target AMF 101b in operation 906. The Nsmf_PDUSession_UpdateSMcontext response message may include an MBS context including at least one of an MBS session ID, TMGI, an ID of the MB-SMF 112, or address information of the MB-SMF for an MBS session associated with the PDU session.

Through operations 907 and 908, the target AMF 101b may request handover to the target NG-RAN 22 and receive a response thereof from the target NG-RAN 22. In determining a delivery mode for the MBS session connected to the PDU session, the target AMF 101b may recognize that the target NG-RAN 22 supports a 5 MBS capability through information already configured with the target NG-RAN 22, and in operation 909, the target AMF 101b may determine to support a service for the corresponding MBS session through shared delivery.

In this case, the target AMF 101b may transmit at least one of information of a shared delivery request, MBS Session ID, TMGI, or MB-SMF ID for the MBS session to the target RAN 22 through the N2 SM request message in operation 914.

When there is no shared tunnel for the corresponding MBS session ID, the target NG-RAN 22 that has received the information may transmit a message including an N2 SM message for generating a shared tunnel to the target AMF 101b in operation 915. The N2 SM message may include at least one of an MBS session ID, TMGI, MB-SMF ID, or target NG-RAN shared tunnel endpoint information (target NG-RAN address, shared tunnel ID, and the like), and the MB-SMF ID is delivered to the target AMF 101b together with the N2 SM message separately from the N2 SM message, so that the target AMF 101b may forward the N2 SM message to the MB-SMF 112 corresponding to the MB-SMF ID. Accordingly, in operation 916, the target AMF 101b may transmit an Nsmf_MBSSession_UpdateSMcontext request message including the N2 SM message to the MB-SMF 112 by including the corresponding MBS session ID. Accordingly, the target AMF 101b may switch to shared delivery, and for a shared tunnel for shared delivery, the MB-SMF 112 may generate a tunnel toward the target-RAN 22 for the corresponding MBS session ID through an N4 session modification process to the MB-UPF 111 in operation 917. Further, the MB-SMF 112 and the target AMF 101b may transmit respective responses to operations 916 and 915, in operation 918, and because the target AMF 101b transmits a response to the message in operation 903 to the serving AMF 101a in operations 917 and 918, the target AMF 101b may complete a handover preparation procedure and perform an HO execution procedure of operation 919.

According to another embodiment of the method illustrated in FIG. 9, when the target NG-RAN 22 has a context for the MBS session, if the target NG-RAN 22 has a shared tunnel for the MBS session, it is not necessary to perform a separate handover procedure for the corresponding MBS session.

However, the target NG-RAN 22 may receive (store) a context for the MBS session from the serving NG-RAN 21, and when the target NG-RAN 22 does not have a shared tunnel for the MBS session, it may be switched to multicast through shared delivery to the target NG-RAN 22 according to the procedure of FIG. 9.

As another example, in operation 908 of FIG. 9, because the target NG-RAN 22 supports a 5 MBS capability and receives (stores) a context for the MBS session from the serving NG-RAN 21, when the target NG-RAN 22 knows an address or ID of MB-SMF serving TMGI and the corresponding MBS session, the target NG-RAN 22 may transmit an N2 SM request message for the corresponding MBS session and the handover request ACK message in operation 908 to the target AMF 101b (the same as operation 915), the target AMF 101b may transmit the N2 SM request message to the corresponding MB-SMF 112, and the MB-SMF 112 may transmit the N2 SM request message to the MB-UPF 111 to perform setup for shared delivery (the same as operations 916 and 917). Therefore, because the shared tunnel was generated, the messages of operations 913 and 914 do not include MB-SMF ID and TMGI information such as a shared delivery request, and operations 915 to 917 are not performed. Meanwhile, HO preparation for N2 handover may be completed by performing the procedures for operations 910, 911, 912, 913 and 918 for a PDU session.

After the HO preparation is completed, as described above, in operation 919, the serving AMF 101a transmits a HO command to the serving NG-RAN 21 to perform an HO execution process.

Through the above method, when the target NG-RAN 22 has an MBS capability, the target NG-RAN 22 may smoothly provide a multicast service to the UE 10 through shared delivery.

Figure 10:
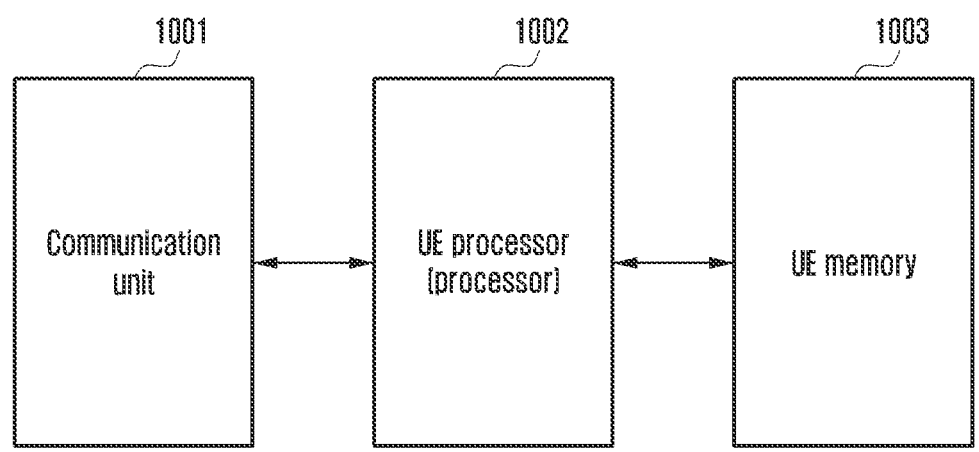
FIG. 10 is a block diagram illustrating a configuration of a terminal to which the disclosure may be applied according to an embodiment of the disclosure.

FIG. 10 is a block diagram illustrating a configuration of a UE to which the disclosure may be applied.

With reference to FIG. 10, the UE 10 may include a communication unit 1001, a UE processor 1002, and a UE memory 1003. The communication unit 1001 may include a wireless communication module capable of communicating with a cellular system such as long term evolution (LTE), LTE-A, and 5G networks, a modem, and/or a communication processor.

The UE processor 1002 may perform overall control of the UE 10, and control to connect and release a call according to a user's request, and to provide a user's customized service. Further, the UE processor 1002 may receive MBS data traffic according to the disclosure, and may control directly an operation required for handover or may control using some configurations of the communication unit 1001.

The UE memory 1003 may include an area for storing various control information necessary for the UE 10 and an area for storing user data.

Further, the UE 10 may have a display device such as a display, LCD and/or LED for an interface with a user, and include various interfaces for detecting a user input. Further, the UE 10 may be implemented to have more components, as needed.

Figure 11:
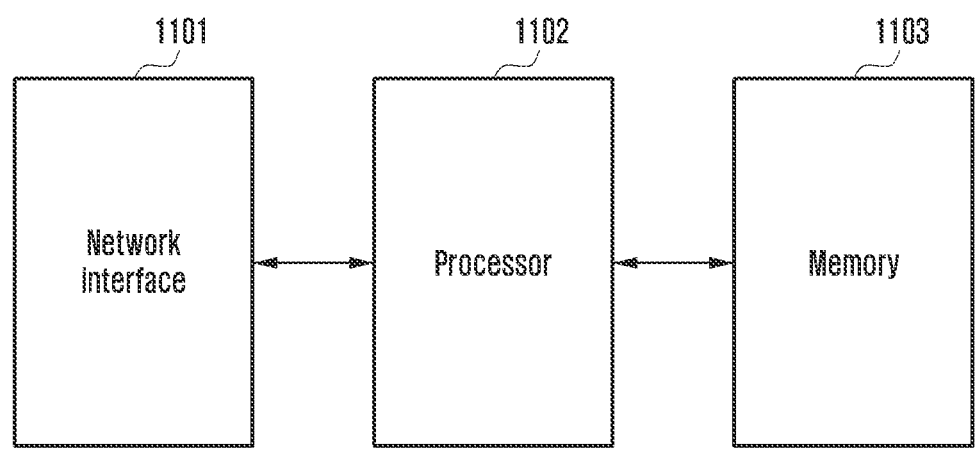
FIG. 11 is a block diagram illustrating a configuration of a network function device to which the disclosure may be applied according to an embodiment of the disclosure.

FIG. 11 is a block diagram illustrating a configuration of a network function (NF) device to which the disclosure may be applied.

Referring to FIG. 11, the NF device may include a network interface 1101, a processor 1102, and a memory 1103. The network interface 1101 may provide an interface for communication with other NFs. For example, when the NF is an AMF, the network interface 1101 may provide an interface for communicating with the SMF. As another example, when the NF is an UPF, the network interface 1101 may provide an interface for transmitting and receiving various data/signals/messages to and from an RNA and/or AMP and/or MB-SMF.

The processor 1102 may control an operation of the corresponding NF. For example, when the NF is an AMF, the processor 1102 may control operations in FIGS. 2 to 9 described above. As another example, when the NF is the SMF, the processor 1102 may control an operation of the SMF during the operation according to FIGS. 2 to 9 described above. Further, when the NF is an MB-SMF/MB-AMF, the processor 1102 may control operations according to the above-described drawings in the same manner.

The memory 1103 may store information for the control of the NF, information generated during the control, and information necessary according to the disclosure.

According to the disclosure, even when a terminal using a multicast service moves in a 5G system (5GS), it is possible to use smoothly the multicast service.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for Xn handover of a multicast/broadcast service (MBS) by a session management function (SMF) in a mobile communication system, the method comprising:

receiving, from a target next generation radio access network (NG-RAN) node through an access and mobility management function (AMF), a first message including information on whether the target NG-RAN node supports the MBS;

determining an individual delivery method for MBS data, in case that the target NG-RAN node does not support the MBS based on the information received from the target NG-RAN node; and performing an establishment of individual MBS data delivery, wherein the information on whether the target NG-RAN node supports the MBS is N2 session management (SM) information received from the target NG-RAN node to the SMF via the AMF.

2. The method of claim 1, wherein the performing the establishment of the individual MBS data delivery comprises:

transmitting, to a multicast/broadcast-session management function (MB-SMF), a session context update request to establish multicast MBS session transmission between a multicast/broadcast user plane function (MB-UPF) and a UPF;

receiving, from the MB-SMF, a session context update response including multicast downlink (DL) tunnel information; and performing modification procedure for an N4 session based on the session context update response.

3. The method of claim 2, wherein the session context update request includes MBS session identifier (ID) and DL tunnel information of the UPF.

4. The method of claim 2, wherein the session context update response includes tunnel endpoint information of the MB-UPF.

5. The method of claim 1, further comprising:
transmitting, to the target NG-RAN through the AMF, a response message for the first message.

6. The method of claim 1,
wherein the first message is a protocol data unit (PDU) session update SM context request message including the N2 SM information, and
wherein the N2 SM information is included in a N2 path switch request message transmitted by the target NG-RAN to the AMF.

7. A session management function (SMF) for Xn handover of a multicast/broadcast service (MBS) in a mobile communication system, the SMF comprising:

a network interface configured to communicate with network functions (NFs) in the mobile communication system;

a memory configured to store information; and at least one processor configured to control to:
receive, from a target next generation radio access network (NG-RAN) node through an access and mobility management function (AMF) using the network interface, a first message including information on whether the target NG-RAN node supports the MBS, determine an individual delivery method for MBS data, in case that the target NG-RAN node does not support the MBS based on the information received from the target NG-RAN node, and perform an establishment of individual MBS data delivery, wherein the information on whether the target NG-RAN node supports the MBS is N2 session management (SM) information received from the target NG-RAN node to the SMF via the AMF.

8. The SMF of claim 7, wherein at least one processor is further configured to control to:

transmit, to a multicast/broadcast-session management function (MB-SMF), a session context update request to establish multicast MBS session transmission between a multicast/broadcast user plane function (MB-UPF) and a UPF;

receive, from the MB-SMF, a session context update response including multicast downlink (DL) tunnel information; and modify with the UPF a N4 sessions based on the session context update response.

9. The SMF of claim 8, wherein the session context update request includes MBS session identifier (ID) and DL tunnel information of the UPF.

10. The SMF of claim 8, wherein the session context update response includes tunnel endpoint information of the MB-UPF.

11. The SMF of claim 7, wherein at least one processor is further configured to control to transmit, to the target NG-RAN through the AMF, a response message for the first message.

12. The SMF of claim 7,
wherein the first message is a protocol data unit (PDU) session update SM context request message including the N2 SM information, and
wherein the N2 SM information is included in a N2 path switch request message transmitted by the target NG-RAN to the AMF.

* * * * *